United States Patent
Carlson et al.

(10) Patent No.: US 9,542,687 B2
(45) Date of Patent: Jan. 10, 2017

(54) SYSTEMS AND METHODS FOR VISUAL REPRESENTATION OF OFFERS

(75) Inventors: Mark Carlson, Half Moon Bay, CA (US); Patrick Faith, Pleasanton, CA (US)

(73) Assignee: VISA INTERNATIONAL SERVICE ASSOCIATION, San Francisco, CA (US)

(*) Notice: Subject to any disclaimer, the term of this patent is extended or adjusted under 35 U.S.C. 154(b) by 807 days.

(21) Appl. No.: 12/491,139

(22) Filed: Jun. 24, 2009

(65) Prior Publication Data
US 2009/0327151 A1 Dec. 31, 2009

Related U.S. Application Data

(60) Provisional application No. 61/076,099, filed on Jun. 26, 2008.

(51) Int. Cl.
*G06Q 30/02* (2012.01)
*G06Q 50/18* (2012.01)
*G09B 29/00* (2006.01)

(52) U.S. Cl.
CPC .......... *G06Q 30/02* (2013.01); *G06Q 30/0222* (2013.01); *G06Q 30/0224* (2013.01); *G06Q 30/0251* (2013.01); *G06Q 30/0252* (2013.01); *G06Q 30/0255* (2013.01); *G06Q 50/188* (2013.01); *G09B 29/007* (2013.01)

(58) Field of Classification Search
CPC ................................................ G06Q 30/0252
USPC ....................................................... 705/14.5
See application file for complete search history.

(56) References Cited

U.S. PATENT DOCUMENTS

| 3,356,021 A | 12/1967 | May et al. |
| 4,044,231 A | 8/1977 | Beck et al. |
| 4,528,442 A | 7/1985 | Endo |
| 4,613,904 A | 9/1986 | Lurie |

(Continued)

FOREIGN PATENT DOCUMENTS

| EP | 1 096 439 A2 | 5/2001 |
| EP | 1 136 961 A1 | 9/2001 |

(Continued)

OTHER PUBLICATIONS

U.S. Appl. No. 60/335,667, filed Feb. 5, 2002.
(Continued)

*Primary Examiner* — David Stoltenberg
(74) *Attorney, Agent, or Firm* — Kilpatrick, Townsend & Stockton, LLP

(57) ABSTRACT

A method and system for providing geographic location notifications for targeted offers is disclosed. One embodiment of the invention is directed to a method including monitoring for an event to trigger a targeted offer. Upon detection of the event, the offer is generated. The offer is targeted to a consumer and is generated using payment data generated in response to transactions conducted by the consumer with a plurality of different merchants. A geographic location for redeeming the offer is determined. A notification message is generated about the offer. The notification message includes the offer and the geographic location for redeeming the offer. The notification message is sent to a notification device which is operated by the consumer. A graphical depiction of the offer is displayed on a map on the notification device.

18 Claims, 14 Drawing Sheets

(56) References Cited

U.S. PATENT DOCUMENTS

| | | |
|---|---|---|
| 4,614,861 A | 9/1986 | Pavlov et al. |
| 4,674,041 A | 6/1987 | Lemon et al. |
| 4,701,601 A | 10/1987 | Francini et al. |
| 4,868,376 A | 9/1989 | Lessin et al. |
| 5,034,597 A | 7/1991 | Atsumi et al. |
| 5,305,196 A | 4/1994 | Deaton et al. |
| 5,311,594 A | 5/1994 | Penzias |
| 5,327,508 A | 7/1994 | Deaton et al. |
| 5,353,218 A | 10/1994 | DeLapa et al. |
| 5,359,183 A | 10/1994 | Skodlar |
| 5,388,165 A | 2/1995 | Deaton et al. |
| RE34,915 E | 4/1995 | Nichtberger et al. |
| 5,420,606 A | 5/1995 | Begum et al. |
| 5,420,926 A | 5/1995 | Low et al. |
| 5,430,644 A | 7/1995 | Deaton et al. |
| 5,448,471 A | 9/1995 | Deaton et al. |
| 5,465,206 A | 11/1995 | Hilt et al. |
| 5,477,038 A | 12/1995 | Levine et al. |
| 5,483,444 A | 1/1996 | Heintzeman et al. |
| 5,500,513 A | 3/1996 | Langhans et al. |
| 5,502,636 A | 3/1996 | Clarke |
| 5,513,250 A | 4/1996 | McAllister |
| 5,530,438 A | 6/1996 | Bickham et al. |
| 5,564,073 A | 10/1996 | Takahisa |
| 5,577,266 A | 11/1996 | Takahisa et al. |
| 5,579,537 A | 11/1996 | Takahisa |
| 5,592,560 A | 1/1997 | Deaton et al. |
| 5,604,921 A | 2/1997 | Alanara |
| 5,615,110 A | 3/1997 | Wong |
| 5,621,201 A | 4/1997 | Langhans et al. |
| 5,621,812 A | 4/1997 | Deaton et al. |
| 5,627,549 A | 5/1997 | Park |
| 5,638,457 A | 6/1997 | Deaton et al. |
| 5,642,485 A | 6/1997 | Deaton et al. |
| 5,644,723 A | 7/1997 | Deaton et al. |
| 5,649,114 A | 7/1997 | Deaton et al. |
| 5,659,165 A | 8/1997 | Jennings et al. |
| 5,659,469 A | 8/1997 | Deaton et al. |
| 5,675,662 A | 10/1997 | Deaton et al. |
| 5,678,939 A | 10/1997 | Ross |
| 5,679,938 A | 10/1997 | Templeton et al. |
| 5,679,940 A | 10/1997 | Templeton et al. |
| 5,687,322 A | 11/1997 | Deaton et al. |
| 5,708,422 A | 1/1998 | Blonder et al. |
| 5,710,886 A | 1/1998 | Christensen et al. |
| 5,717,866 A | 2/1998 | Naftzger |
| 5,761,648 A | 6/1998 | Golden et al. |
| 5,774,525 A | 6/1998 | Kanevsky et al. |
| 5,777,903 A | 7/1998 | Piosenka et al. |
| 5,791,991 A | 8/1998 | Small |
| 5,793,972 A | 8/1998 | Shane |
| 5,806,044 A | 9/1998 | Powell |
| 5,822,735 A | 10/1998 | De Lapa et al. |
| 5,852,775 A | 12/1998 | Hidary |
| 5,855,007 A | 12/1998 | Jovicic et al. |
| 5,870,030 A | 2/1999 | Deluca et al. |
| 5,872,834 A | 2/1999 | Teitelbaum |
| 5,878,337 A | 3/1999 | Joao et al. |
| 5,884,277 A | 3/1999 | Khosla |
| 5,903,830 A | 5/1999 | Joao et al. |
| 5,903,878 A | 5/1999 | Talati et al. |
| 5,905,246 A | 5/1999 | Fajkowski |
| 5,907,830 A | 5/1999 | Engel et al. |
| 5,914,472 A | 6/1999 | Foladare et al. |
| 5,924,080 A | 7/1999 | Johnson |
| 5,959,577 A | 9/1999 | Fan et al. |
| 5,974,399 A | 10/1999 | Giuliani et al. |
| 5,988,497 A | 11/1999 | Wallace |
| 5,991,749 A | 11/1999 | Morrill, Jr. |
| 5,991,750 A | 11/1999 | Watson |
| 6,002,771 A | 12/1999 | Nielsen |
| 6,003,326 A | 12/1999 | Hensley |
| 6,009,411 A | 12/1999 | Kepecs |
| 6,009,415 A | 12/1999 | Shurling et al. |
| 6,012,038 A | 1/2000 | Powell |
| 6,012,144 A | 1/2000 | Pickett |
| 6,014,634 A | 1/2000 | Scroggie et al. |
| 6,018,718 A | 1/2000 | Walker et al. |
| 6,029,151 A | 2/2000 | Nikander |
| 6,035,280 A | 3/2000 | Christensen |
| 6,041,309 A | 3/2000 | Laor |
| 6,049,778 A | 4/2000 | Walker et al. |
| 6,052,675 A | 4/2000 | Checchio |
| 6,055,505 A | 4/2000 | Elston |
| 6,055,570 A | 4/2000 | Nielsen |
| 6,062,991 A | 5/2000 | Moriarty et al. |
| 6,064,990 A | 5/2000 | Goldsmith |
| 6,067,526 A | 5/2000 | Powell |
| 6,067,529 A | 5/2000 | Ray et al. |
| 6,076,068 A | 6/2000 | DeLapa et al. |
| 6,076,069 A | 6/2000 | Laor |
| 6,076,101 A | 6/2000 | Kamakura et al. |
| 6,081,792 A | 6/2000 | Cucinotta et al. |
| 6,095,413 A | 8/2000 | Tetro et al. |
| 6,122,624 A | 9/2000 | Tetro et al. |
| 6,128,599 A | 10/2000 | Walker et al. |
| 6,185,290 B1 | 2/2001 | Shaffer et al. |
| 6,185,541 B1 | 2/2001 | Scroggie et al. |
| 6,195,542 B1 | 2/2001 | Griffith |
| 6,219,793 B1 | 4/2001 | Li et al. |
| 6,227,447 B1 | 5/2001 | Campisano |
| 6,237,145 B1 | 5/2001 | Narasimhan et al. |
| 6,247,129 B1 | 6/2001 | Keathley et al. |
| 6,263,447 B1 | 7/2001 | French et al. |
| 6,267,292 B1 | 7/2001 | Walker et al. |
| 6,279,112 B1 | 8/2001 | O'Toole, Jr. et al. |
| 6,292,786 B1 | 9/2001 | Deaton et al. |
| 6,307,958 B1 | 10/2001 | Deaton et al. |
| 6,311,169 B2 | 10/2001 | Duhon |
| 6,317,718 B1 | 11/2001 | Fano |
| 6,318,631 B1 | 11/2001 | Halperin |
| 6,321,208 B1 | 11/2001 | Barnett et al. |
| 6,330,543 B1 | 12/2001 | Kepecs |
| 6,330,550 B1 | 12/2001 | Brisebois et al. |
| 6,334,108 B1 | 12/2001 | Deaton et al. |
| 6,336,098 B1 | 1/2002 | Fortenberry et al. |
| 6,336,099 B1 | 1/2002 | Barnett et al. |
| 6,341,724 B2 | 1/2002 | Campisano |
| 6,351,735 B1 | 2/2002 | Deaton et al. |
| 6,353,398 B1 | 3/2002 | Amin et al. |
| 6,377,935 B1 | 4/2002 | Deaton et al. |
| 6,378,775 B2 | 4/2002 | Hayashida |
| 6,381,324 B1 | 4/2002 | Shaffer et al. |
| 6,409,778 B1 | 6/2002 | Auschra et al. |
| 6,424,949 B1 | 7/2002 | Deaton et al. |
| 6,424,951 B1 | 7/2002 | Shurling et al. |
| 6,434,534 B1 | 8/2002 | Walker et al. |
| 6,470,181 B1 | 10/2002 | Maxwell |
| 6,484,146 B2 | 11/2002 | Day et al. |
| 6,484,148 B1 | 11/2002 | Boyd |
| 6,488,203 B1 | 12/2002 | Stoutenburg et al. |
| 6,488,206 B1 | 12/2002 | Flaig et al. |
| 6,496,936 B1 | 12/2002 | French et al. |
| 6,505,046 B1 | 1/2003 | Baker |
| 6,516,302 B1 | 2/2003 | Deaton et al. |
| 6,529,725 B1 | 3/2003 | Joao et al. |
| 6,535,855 B1 | 3/2003 | Cahill et al. |
| 6,553,100 B1 | 4/2003 | Chen et al. |
| 6,560,581 B1 | 5/2003 | Fox et al. |
| 6,571,279 B1 | 5/2003 | Herz et al. |
| 6,584,309 B1 | 6/2003 | Whigham |
| 6,587,835 B1 | 7/2003 | Treyz et al. |
| 6,594,376 B2 | 7/2003 | Hoffman et al. |
| 6,601,759 B2 | 8/2003 | Fife et al. |
| 6,608,556 B2 | 8/2003 | De Moerloose et al. |
| 6,609,104 B1 | 8/2003 | Deaton et al. |
| 6,611,811 B1 | 8/2003 | Deaton et al. |
| 6,612,488 B2 | 9/2003 | Suzuki |
| 6,631,849 B2 | 10/2003 | Blossom |
| 6,647,257 B2 | 11/2003 | Owensby |
| 6,647,269 B2 | 11/2003 | Hendrey et al. |
| 6,664,948 B2 | 12/2003 | Crane et al. |
| 6,684,195 B1 | 1/2004 | Deaton et al. |
| 6,685,093 B2 | 2/2004 | Challa et al. |

(56) References Cited

U.S. PATENT DOCUMENTS

| | | |
|---|---|---|
| 6,715,672 B1 | 4/2004 | Tetro et al. |
| 6,736,322 B2 | 5/2004 | Gobburu et al. |
| 6,741,188 B1 | 5/2004 | Miller et al. |
| 6,747,547 B2 | 6/2004 | Benson |
| 6,749,118 B2 | 6/2004 | Kobayashi et al. |
| RE38,572 E | 8/2004 | Tetro et al. |
| 6,775,539 B2 | 8/2004 | Deshpande |
| 6,813,606 B2 | 11/2004 | Veyama et al. |
| 6,823,318 B1 | 11/2004 | Creswell et al. |
| 6,832,721 B2 | 12/2004 | Fujii |
| 6,837,425 B2 | 1/2005 | Gauthier et al. |
| 6,842,774 B1 | 1/2005 | Piccioni |
| 6,857,073 B2 | 2/2005 | French et al. |
| 6,862,575 B1 | 3/2005 | Anttila et al. |
| 6,868,391 B1 | 3/2005 | Hultgren |
| 6,877,661 B2 | 4/2005 | Webb et al. |
| 6,877,665 B2 | 4/2005 | Challa et al. |
| 6,879,838 B2 | 4/2005 | Rankin et al. |
| 6,883,708 B1 | 4/2005 | Fiedler et al. |
| 6,892,941 B2 | 5/2005 | Rosenblum |
| 6,912,398 B1 | 6/2005 | Domnitz |
| 6,913,194 B2 | 7/2005 | Suzuki |
| 6,920,611 B1 | 7/2005 | Spaeth et al. |
| 6,948,656 B2 | 9/2005 | Williams |
| 6,968,180 B2 | 11/2005 | Kirby et al. |
| 6,970,850 B1 | 11/2005 | Freeny, Jr. |
| 6,975,852 B1 | 12/2005 | Sofer et al. |
| 6,988,657 B1 | 1/2006 | Singer et al. |
| 6,990,330 B2 | 1/2006 | Voerepalli et al. |
| 6,993,326 B2 | 1/2006 | Link, II et al. |
| 7,003,497 B2 | 2/2006 | Maes |
| 7,007,840 B2 | 3/2006 | Davis |
| 7,013,286 B1 | 3/2006 | Aggarwal et al. |
| 7,014,107 B2 | 3/2006 | Singer et al. |
| 7,024,211 B1 | 4/2006 | Martin |
| 7,024,374 B1 | 4/2006 | Day et al. |
| 7,025,256 B1 | 4/2006 | Drummond et al. |
| 7,027,801 B1 | 4/2006 | Hall et al. |
| 7,028,052 B2 | 4/2006 | Chapman et al. |
| 7,028,906 B2 | 4/2006 | Challa et al. |
| 7,039,423 B2 | 5/2006 | Daniel et al. |
| 7,039,611 B2 | 5/2006 | Devine |
| 7,040,533 B1 | 5/2006 | Ramachandran |
| 7,051,923 B2 | 5/2006 | Nguyen et al. |
| 7,055,031 B2 | 5/2006 | Platt |
| 7,058,611 B2 | 6/2006 | Kranzley et al. |
| 7,069,001 B2 | 6/2006 | Rupp et al. |
| 7,076,329 B1 | 7/2006 | Kolls |
| 7,089,208 B1 | 8/2006 | Levchin et al. |
| 7,092,724 B2 | 8/2006 | Fellenstein et al. |
| 7,096,003 B2 | 8/2006 | Joao et al. |
| 7,099,850 B1 | 8/2006 | Mann et al. |
| 7,100,821 B2 | 9/2006 | Rasti |
| 7,104,446 B2 | 9/2006 | Bortolin et al. |
| 7,107,250 B2 | 9/2006 | Harrison |
| 7,110,954 B2 | 9/2006 | Yung et al. |
| 7,121,456 B2 | 10/2006 | Spaeth et al. |
| 7,124,937 B2 | 10/2006 | Myers et al. |
| 7,136,841 B2 | 11/2006 | Cook |
| 7,150,393 B1 | 12/2006 | Drummond et al. |
| 7,152,780 B2 | 12/2006 | Gauthier et al. |
| 7,152,788 B2 | 12/2006 | Williams |
| 7,159,770 B2 | 1/2007 | Onozu et al. |
| 7,167,711 B1 | 1/2007 | Dennis |
| 7,194,437 B1 | 3/2007 | Britto et al. |
| 7,201,313 B1 | 4/2007 | Ramachandran |
| 7,203,300 B2 | 4/2007 | Shaffer et al. |
| 7,207,477 B1 | 4/2007 | Ramachandran |
| 7,213,755 B2 | 5/2007 | Newsome et al. |
| 7,225,156 B2 | 5/2007 | Fisher et al. |
| 7,231,357 B1 | 6/2007 | Shanman |
| 7,231,372 B1 | 6/2007 | Prange et al. |
| 7,231,657 B2 | 6/2007 | Honarvar et al. |
| 7,236,799 B2 | 6/2007 | Wilson et al. |
| RE39,736 E | 7/2007 | Morrill, Jr. |
| 7,243,853 B1 | 7/2007 | Levy et al. |
| 7,251,624 B1 | 7/2007 | Lee et al. |
| 7,257,545 B1 | 8/2007 | Hung |
| 7,264,154 B2 | 9/2007 | Harris |
| 7,280,981 B2 | 10/2007 | Huang et al. |
| 7,290,704 B1 | 11/2007 | Ball et al. |
| 7,292,996 B2 | 11/2007 | Nobrega et al. |
| 7,308,254 B1 | 12/2007 | Rissanen |
| 7,310,534 B2 | 12/2007 | Northcutt |
| 7,343,149 B2 | 3/2008 | Benco et al. |
| 7,343,317 B2 | 3/2008 | Jokinen et al. |
| 7,349,668 B2 | 3/2008 | Ilan et al. |
| 7,350,702 B2 | 4/2008 | Bortolin et al. |
| 7,353,187 B1 | 4/2008 | Emodi et al. |
| 7,356,516 B2 | 4/2008 | Richey et al. |
| 7,357,310 B2 | 4/2008 | Calabrese et al. |
| 7,376,431 B2 | 5/2008 | Niedermeyer |
| 7,407,094 B2 | 8/2008 | Myers et al. |
| 7,440,771 B2 | 10/2008 | Purk |
| 7,447,662 B2 | 11/2008 | Gibson |
| 7,464,867 B1 | 12/2008 | Kolls |
| 7,653,599 B2 | 1/2010 | Doran et al. |
| 8,000,726 B2 | 8/2011 | Altman et al. |
| 8,073,461 B2 | 12/2011 | Altman et al. |
| 8,489,452 B1* | 7/2013 | Warner et al. ............ 705/14.38 |
| 2001/0013542 A1 | 8/2001 | Horowitz et al. |
| 2001/0029485 A1 | 10/2001 | Brody et al. |
| 2001/0049636 A1 | 12/2001 | Hudda et al. |
| 2002/0013711 A1 | 1/2002 | Ahuja et al. |
| 2002/0062249 A1 | 5/2002 | Iannaci et al. |
| 2002/0065713 A1* | 5/2002 | Awada et al. .................. 705/14 |
| 2002/0077964 A1 | 6/2002 | Brody et al. |
| 2002/0087460 A1 | 7/2002 | Hornung |
| 2002/0091569 A1 | 7/2002 | Kitaura et al. |
| 2002/0091945 A1 | 7/2002 | Ross |
| 2002/0102993 A1 | 8/2002 | Hendrey et al. |
| 2002/0107027 A1 | 8/2002 | O'Neil |
| 2002/0108062 A1 | 8/2002 | Nakajima et al. |
| 2002/0111852 A1 | 8/2002 | Levine |
| 2002/0128903 A1 | 9/2002 | Kernahan |
| 2002/0133462 A1 | 9/2002 | Shteyn |
| 2002/0140542 A1 | 10/2002 | Prokoski et al. |
| 2002/0156677 A1 | 10/2002 | Peters et al. |
| 2002/0160761 A1 | 10/2002 | Wolfe |
| 2002/0161647 A1* | 10/2002 | Gailey et al. .................. 705/14 |
| 2002/0161701 A1 | 10/2002 | Warmack |
| 2002/0165775 A1 | 11/2002 | Tagseth et al. |
| 2002/0169713 A1 | 11/2002 | Chang et al. |
| 2002/0169719 A1 | 11/2002 | Dively et al. |
| 2002/0190118 A1 | 12/2002 | Davenport et al. |
| 2002/0198777 A1 | 12/2002 | Yuasa |
| 2003/0004802 A1* | 1/2003 | Callegari ........................ 705/14 |
| 2003/0004808 A1 | 1/2003 | Elhaoussine et al. |
| 2003/0006911 A1 | 1/2003 | Smith et al. |
| 2003/0058261 A1 | 3/2003 | Challa et al. |
| 2003/0061163 A1 | 3/2003 | Durfield |
| 2003/0061211 A1 | 3/2003 | Shultz et al. |
| 2003/0062214 A1 | 4/2003 | Smith et al. |
| 2003/0105707 A1 | 6/2003 | Audebert et al. |
| 2003/0120593 A1 | 6/2003 | Bansal et al. |
| 2003/0126078 A1 | 7/2003 | Vihinen |
| 2003/0126095 A1 | 7/2003 | Allen |
| 2003/0135463 A1 | 7/2003 | Brown et al. |
| 2003/0144907 A1 | 7/2003 | Cohen et al. |
| 2003/0154126 A1 | 8/2003 | Gehlot et al. |
| 2003/0163359 A1 | 8/2003 | Kanesaka |
| 2003/0172040 A1 | 9/2003 | Kemper et al. |
| 2003/0182191 A1 | 9/2003 | Oliver et al. |
| 2003/0201500 A1 | 10/2003 | Furukawa et al. |
| 2003/0208406 A1 | 11/2003 | Okamoto et al. |
| 2003/0208684 A1 | 11/2003 | Camacho et al. |
| 2003/0212595 A1 | 11/2003 | Antonucci |
| 2003/0212642 A1 | 11/2003 | Weller et al. |
| 2003/0220835 A1 | 11/2003 | Barnes, Jr. |
| 2003/0222134 A1 | 12/2003 | Boyd |
| 2003/0225618 A1 | 12/2003 | Hessburg et al. |
| 2003/0230630 A1 | 12/2003 | Whipple et al. |
| 2003/0233292 A1 | 12/2003 | Richey et al. |
| 2004/0019522 A1 | 1/2004 | Bortolin et al. |

(56) References Cited

U.S. PATENT DOCUMENTS

| | | |
|---|---|---|
| 2004/0024638 A1 | 2/2004 | Restis |
| 2004/0030607 A1 | 2/2004 | Gibson |
| 2004/0039691 A1 | 2/2004 | Barratt et al. |
| 2004/0044621 A1 | 3/2004 | Huang et al. |
| 2004/0049455 A1 | 3/2004 | Mohsenzadeh |
| 2004/0050922 A1 | 3/2004 | Gauthier et al. |
| 2004/0054575 A1 | 3/2004 | Marshall |
| 2004/0054581 A1 | 3/2004 | Redford et al. |
| 2004/0054590 A1 | 3/2004 | Redford et al. |
| 2004/0054591 A1 | 3/2004 | Spaeth et al. |
| 2004/0064403 A1 | 4/2004 | Hasumi et al. |
| 2004/0064406 A1 | 4/2004 | Yates et al. |
| 2004/0078340 A1 | 4/2004 | Evans |
| 2004/0093274 A1 | 5/2004 | Vanska et al. |
| 2004/0103049 A1 | 5/2004 | Kerr |
| 2004/0117254 A1 | 6/2004 | Nemirofsky et al. |
| 2004/0133653 A1 | 7/2004 | Defosse et al. |
| 2004/0137886 A1 | 7/2004 | Ross et al. |
| 2004/0139021 A1 | 7/2004 | Reed et al. |
| 2004/0148224 A1 | 7/2004 | Gauthier et al. |
| 2004/0148253 A1 | 7/2004 | Shin et al. |
| 2004/0153715 A1 | 8/2004 | Spaeth et al. |
| 2004/0158534 A1 | 8/2004 | Azami et al. |
| 2004/0199470 A1 | 10/2004 | Ferry et al. |
| 2004/0220964 A1 | 11/2004 | Shiftan et al. |
| 2004/0243519 A1 | 12/2004 | Perttila et al. |
| 2004/0254848 A1 | 12/2004 | Golan et al. |
| 2004/0260653 A1 | 12/2004 | Tsuei et al. |
| 2005/0015300 A1* | 1/2005 | Smith et al. ............ 705/14 |
| 2005/0021400 A1 | 1/2005 | Postrel |
| 2005/0021456 A1 | 1/2005 | Steele et al. |
| 2005/0029344 A1 | 2/2005 | Davis |
| 2005/0035847 A1 | 2/2005 | Bonalle et al. |
| 2005/0036611 A1 | 2/2005 | Seaton et al. |
| 2005/0045718 A1 | 3/2005 | Bortolin et al. |
| 2005/0055270 A1 | 3/2005 | Broe |
| 2005/0058427 A1 | 3/2005 | Nguyen et al. |
| 2005/0071225 A1 | 3/2005 | Bortolin et al. |
| 2005/0071226 A1 | 3/2005 | Nguyen et al. |
| 2005/0071227 A1 | 3/2005 | Hammad et al. |
| 2005/0071228 A1 | 3/2005 | Bortolin et al. |
| 2005/0075958 A1 | 4/2005 | Gonzalez |
| 2005/0080716 A1 | 4/2005 | Belyi et al. |
| 2005/0091118 A1 | 4/2005 | Fano |
| 2005/0097473 A1 | 5/2005 | Malik et al. |
| 2005/0102233 A1 | 5/2005 | Park et al. |
| 2005/0102234 A1 | 5/2005 | Devine |
| 2005/0121506 A1 | 6/2005 | Gauthier et al. |
| 2005/0149455 A1 | 7/2005 | Bruesewitz et al. |
| 2005/0165684 A1 | 7/2005 | Jensen et al. |
| 2005/0177510 A1 | 8/2005 | Hilt et al. |
| 2005/0199714 A1 | 9/2005 | Brandt et al. |
| 2005/0210387 A1 | 9/2005 | Alagappan et al. |
| 2005/0216337 A1 | 9/2005 | Roberts et al. |
| 2005/0219061 A1 | 10/2005 | Lai et al. |
| 2005/0222933 A1 | 10/2005 | Wesby |
| 2005/0228719 A1 | 10/2005 | Roberts et al. |
| 2005/0283416 A1 | 12/2005 | Reid et al. |
| 2005/0283430 A1 | 12/2005 | Reid et al. |
| 2005/0283431 A1 | 12/2005 | Reid et al. |
| 2005/0283432 A1 | 12/2005 | Reid et al. |
| 2005/0283433 A1 | 12/2005 | Reid et al. |
| 2006/0004631 A1 | 1/2006 | Roberts et al. |
| 2006/0010231 A1 | 1/2006 | Spector |
| 2006/0043473 A1 | 3/2006 | Eppich |
| 2006/0043474 A1 | 3/2006 | Kinzer et al. |
| 2006/0053056 A1 | 3/2006 | Alspach-Goss et al. |
| 2006/0059110 A1 | 3/2006 | Madhok et al. |
| 2006/0074769 A1 | 4/2006 | Looney et al. |
| 2006/0080243 A1 | 4/2006 | Kemper et al. |
| 2006/0085260 A1 | 4/2006 | Yamagishi |
| 2006/0089905 A1 | 4/2006 | Song et al. |
| 2006/0099936 A1* | 5/2006 | Link et al. ............ 455/414.1 |
| 2006/0111967 A1 | 5/2006 | Forbes |
| 2006/0122881 A1 | 6/2006 | Walker et al. |
| 2006/0122921 A1 | 6/2006 | Comerford et al. |
| 2006/0131385 A1 | 6/2006 | Kim |
| 2006/0136546 A1 | 6/2006 | Trioano et al. |
| 2006/0149529 A1 | 7/2006 | Nguyen et al. |
| 2006/0155644 A1 | 7/2006 | Reid et al. |
| 2006/0161435 A1 | 7/2006 | Atef et al. |
| 2006/0161599 A1 | 7/2006 | Rosen |
| 2006/0163345 A1 | 7/2006 | Myers et al. |
| 2006/0165060 A1 | 7/2006 | Dua |
| 2006/0175403 A1 | 8/2006 | Fossen McConnell et al. |
| 2006/0178957 A1 | 8/2006 | LeClaire |
| 2006/0179007 A1 | 8/2006 | Davis |
| 2006/0200396 A1 | 9/2006 | Satterfield et al. |
| 2006/0202025 A1 | 9/2006 | Calabrese et al. |
| 2006/0206376 A1 | 9/2006 | Gibbs et al. |
| 2006/0218086 A1 | 9/2006 | Campbell et al. |
| 2006/0224449 A1 | 10/2006 | Byerley et al. |
| 2006/0229945 A1* | 10/2006 | Walker et al. ............ 705/14 |
| 2006/0248007 A1 | 11/2006 | Hofer et al. |
| 2006/0253389 A1 | 11/2006 | Hagale et al. |
| 2006/0253390 A1 | 11/2006 | McCarthy et al. |
| 2006/0270421 A1 | 11/2006 | Phillips et al. |
| 2006/0281439 A1 | 12/2006 | Benco et al. |
| 2006/0282382 A1 | 12/2006 | Balasubramanian et al. |
| 2006/0290501 A1 | 12/2006 | Hammad et al. |
| 2006/0293027 A1 | 12/2006 | Hammad et al. |
| 2007/0001000 A1 | 1/2007 | Nguyen et al. |
| 2007/0001001 A1 | 1/2007 | Myers et al. |
| 2007/0005613 A1 | 1/2007 | Singh et al. |
| 2007/0005774 A1 | 1/2007 | Singh et al. |
| 2007/0011099 A1 | 1/2007 | Sheehan |
| 2007/0012764 A1 | 1/2007 | Bortolin et al. |
| 2007/0017970 A1 | 1/2007 | Gauthier et al. |
| 2007/0027803 A1 | 2/2007 | Brandes et al. |
| 2007/0034682 A1 | 2/2007 | Williams |
| 2007/0050259 A1 | 3/2007 | Wesley |
| 2007/0055597 A1 | 3/2007 | Patel et al. |
| 2007/0055630 A1 | 3/2007 | Gauthier et al. |
| 2007/0057034 A1 | 3/2007 | Gauthier et al. |
| 2007/0057051 A1 | 3/2007 | Bortolin et al. |
| 2007/0083465 A1 | 4/2007 | Ciurea et al. |
| 2007/0094150 A1 | 4/2007 | Yven et al. |
| 2007/0100691 A1 | 5/2007 | Patterson |
| 2007/0107044 A1 | 5/2007 | Yven et al. |
| 2007/0125842 A1 | 6/2007 | Antoo et al. |
| 2007/0136131 A1 | 6/2007 | Mankoff |
| 2007/0155402 A1 | 7/2007 | Van Erlach |
| 2007/0162328 A1 | 7/2007 | Reich |
| 2007/0174259 A1* | 7/2007 | Amjadi ............ G06F 17/30864 |
| 2007/0178912 A1 | 8/2007 | Baranowski |
| 2007/0179819 A1* | 8/2007 | Bradley et al. ............ 705/5 |
| 2007/0185776 A1 | 8/2007 | Nguyen et al. |
| 2007/0194104 A1 | 8/2007 | Fukuda |
| 2007/0203836 A1 | 8/2007 | Dodin |
| 2007/0205270 A1 | 9/2007 | Kemper et al. |
| 2007/0226051 A1 | 9/2007 | Addepalli et al. |
| 2007/0241189 A1 | 10/2007 | Slavin et al. |
| 2007/0244811 A1 | 10/2007 | Tumminaro |
| 2007/0250380 A1 | 10/2007 | Mankoff |
| 2007/0262136 A1 | 11/2007 | Ou |
| 2007/0276764 A1 | 11/2007 | Mann |
| 2007/0281689 A1 | 12/2007 | Altman et al. |
| 2007/0281690 A1 | 12/2007 | Altman et al. |
| 2007/0281716 A1 | 12/2007 | Altman et al. |
| 2007/0282621 A1 | 12/2007 | Altman et al. |
| 2007/0288373 A1 | 12/2007 | Wilkes |
| 2007/0288641 A1 | 12/2007 | Lee et al. |
| 2008/0000964 A1 | 1/2008 | Flake et al. |
| 2008/0003987 A1 | 1/2008 | Mechaley |
| 2008/0004950 A1 | 1/2008 | Huang et al. |
| 2008/0006685 A1 | 1/2008 | Rackley, III et al. |
| 2008/0017708 A1 | 1/2008 | Singer-Harter |
| 2008/0021784 A1 | 1/2008 | Hessburg et al. |
| 2008/0040265 A1 | 2/2008 | Rackley, III et al. |
| 2008/0052168 A1 | 2/2008 | Peters et al. |
| 2008/0059297 A1 | 3/2008 | Vallier et al. |
| 2008/0070593 A1 | 3/2008 | Altman et al. |
| 2008/0071614 A1 | 3/2008 | Mebruer et al. |
| 2008/0082424 A1 | 4/2008 | Walton |

(56) References Cited

U.S. PATENT DOCUMENTS

| | | | |
|---|---|---|---|
| 2008/0114657 A1 | 5/2008 | Forzley | |
| 2008/0120182 A1 | 5/2008 | Arnold et al. | |
| 2008/0132251 A1 | 6/2008 | Altman et al. | |
| 2008/0132252 A1 | 6/2008 | Altman et al. | |
| 2008/0133336 A1 | 6/2008 | Altman et al. | |
| 2008/0133366 A1 | 6/2008 | Evans et al. | |
| 2008/0139112 A1 | 6/2008 | Sampath et al. | |
| 2008/0139181 A1 | 6/2008 | Lokshin | |
| 2008/0147484 A1 | 6/2008 | Davis | |
| 2008/0147495 A1 | 6/2008 | Bal et al. | |
| 2008/0154727 A1 | 6/2008 | Carlson et al. | |
| 2008/0154735 A1 | 6/2008 | Carlson | |
| 2008/0154772 A1 | 6/2008 | Carlson | |
| 2008/0156870 A1 | 7/2008 | Niedermeyer et al. | |
| 2008/0161018 A1 | 7/2008 | Miller et al. | |
| 2008/0163257 A1 | 7/2008 | Carlson et al. | |
| 2008/0167991 A1 | 7/2008 | Carlson et al. | |
| 2008/0182590 A1 | 7/2008 | Ruckart et al. | |
| 2008/0183480 A1 | 7/2008 | Carlson et al. | |
| 2008/0201226 A1 | 8/2008 | Carlson et al. | |
| 2008/0201310 A1 | 8/2008 | Fitzpatrick et al. | |
| 2008/0201321 A1 | 8/2008 | Fitzpatrick et al. | |
| 2008/0208762 A1* | 8/2008 | Arthur et al. | 705/79 |
| 2008/0300973 A1 | 12/2008 | DeWitt et al. | |
| 2008/0319843 A1 | 12/2008 | Moser et al. | |
| 2009/0076896 A1 | 3/2009 | DeWitt et al. | |
| 2009/0076925 A1 | 3/2009 | DeWitt et al. | |
| 2009/0078777 A1 | 3/2009 | Granucci et al. | |
| 2009/0081990 A1 | 3/2009 | Granucci et al. | |
| 2009/0112721 A1 | 4/2009 | Hammad et al. | |
| 2009/0119170 A1 | 5/2009 | Hammad et al. | |
| 2009/0182634 A1 | 7/2009 | Park et al. | |
| 2009/0314840 A1 | 12/2009 | Granucci et al. | |
| 2009/0327134 A1 | 12/2009 | Carlson et al. | |
| 2009/0327151 A1 | 12/2009 | Carlson et al. | |
| 2010/0017275 A1 | 1/2010 | Carlson et al. | |
| 2011/0035284 A1 | 2/2011 | Moshfeghi | |

FOREIGN PATENT DOCUMENTS

| | | |
|---|---|---|
| EP | 1 178 421 A2 | 2/2002 |
| GB | 2 348 781 B | 11/2003 |
| JP | 2001-76058 A | 3/2001 |
| JP | 2001-222767 A | 8/2001 |
| JP | 2002-117313 A | 4/2002 |
| JP | 2002-318960 A | 10/2002 |
| JP | 2005-215849 A | 8/2005 |
| JP | 2006-268376 A | 10/2006 |
| KR | 2006 0117091 A | 11/2006 |
| WO | 96/13814 A1 | 5/1996 |
| WO | WO 97/45814 A1 | 4/1997 |
| WO | 97/45814 A1 | 12/1997 |
| WO | WO 99/51038 A2 | 10/1999 |
| WO | WO 00/03328 A1 | 1/2000 |
| WO | 00/77697 A1 | 12/2000 |
| WO | 2004/077369 A1 | 9/2004 |
| WO | 2005/052869 A1 | 6/2005 |
| WO | 2006/024080 A1 | 3/2006 |
| WO | WO 2007/056449 A2 | 5/2007 |
| WO | WO 2007/056450 A2 | 5/2007 |

OTHER PUBLICATIONS

U.S. Appl. No. 60/356,861, filed Feb. 12, 2002.
U.S. Appl. No. 60/361,646, filed Mar. 4, 2002.
U.S. Appl. No. 12/491,125, filed Jun. 24, 2009.
Japanese Office Action mailed on Aug. 10, 2012 for JP Patent Application No. 2009-544232, with English Translation, 9 pages.
Australian Office Action mailed on Sep. 5, 2011 for AU Patent Application No. 2007339916, 3 pages.
Australian Notice of Acceptance mailed on Mar. 28, 2012 for AU Patent Application No. 2007339916, 3 pages.
Chinese Office Action mailed on Dec. 3, 2010 for CN Patent Application No. 200780050840.7, with English Translation, 2 pages.
Chinese Office Action mailed on Nov. 22, 2011 for CN Patent Application No. 200780050840.7, with English Translation, 15 pages.
Chinese Office Action mailed on Jun. 4, 2012 for CN Patent Application No. 200780050840.7, with English Translation, 15 pages.
European Search Report mailed on Dec. 15, 2011 for EP Patent Application No. 07869801.6, 7 pages.
"SmarTrip More Than a Smart Card. It's Pure Genius", 1998-2004, WMATA, http://www.wmata.com/riding/smartrip.cfm (2 pages).
"Adding value to SmarTrip is as easy as using it", 1998-2004, WMATA, http://www.wmata.com/riding/smartrip_adding_value.cfm (1 page).
"Virtual Shopping: Straight Goods on Cyber-stores and Security." Chatelaine; vol. 70, p. 24 (Feb. 1997).
Emmerson, Kassidy; "The History of PayPal: One of the Most Successful Online Money Transmitters Today"; 2009, http://www.associatedcontent.com/pop_print.shtml?content_type=arti . . . , 1 page.
International Preliminary Report on Patentability and Written Opinion from International Application No. PCT/US2007/088615, dated Jul. 9, 2009.
International Preliminary Report on Patentability from International Application No. PCT/US2007/088289 dated Jul. 9, 2009.
International Preliminary Report on Patentability from International Application No. PCT/US2007/088313 dated Jun. 30, 2008.
International Preliminary Report on Patentability from International Application No. PCT/US2007/088687 dated Jul. 9, 2009.
International Preliminary Report on Patentability from PCT/US2007/088563, dated Jul. 9, 2009.
International Preliminary Report on Patentability from International Application No. PCT/US2007/088313 dated Jul. 9, 2009.
International Search Report and Written Opinion from PCT/US2007/088289, dated May 15, 2008.
International Preliminary Report on Patentability from International Application No. PCT/US2007/088659 dated Jul. 9, 2009.
About Us, 1 page downloaded from http://www.cellfire.com/about-us/ on May 10, 2007, 1 page.
bCode™ is the future of Mobile Coupon, Ticketing, Loyalty and Payments, 2 page product brochure downloaded from http://www.bcode.com on May 11, 2007, 2 pages.
bCode™ MediaHub 200 Mobile Coupon, Ticketing Loyalty and Payments, 2 page product brochure, from http://www.bcode.com/news_media.htm on May 11, 2007, 2 pages.
Cellfire—Mobile coupons for your cell phone, 1 page product brochure downloaded from http://www.cellfire.com on May 11, 2007, 1 page.
Cellfire, Coupons on Cellfire, 2 pages downloaded from http://www.cellfire.com/coupons on May 10, 2007, 2 pages.
Press Release, "Three months after California release, Cellfire™ reports redemption rates n times greater than paper coupons," issued by Cellfire, Inc. Mar. 22, 2006; pp. 1-2 downloaded from http://www.cellfire.com/about-us/articles/2006-03-22_redemption-rate, 2 pages.
Purdy et al., "When Mobile Coupons Replace Paper Coupons, Everyone Wins," pp. 1-17 published by Frost & Sullivan.[online]. info.cellfire.com, May 11, 2007, [Retrieved from the Internet: URL: http://info.cellfire.com/cellfire/themes/cellfire/downloads/When_Mobile_Coupons_Replace_Paper_Coupons.pdf], 17 pages.
Kageyama, Yuri; "Japanese carrier unveils mobile-phone wallet," [online], [retrieved from the on Feb. 5, 2007]. Retrieved from the internet <URL: http://usatoday.printthis.clickability.com/pt/cpt?action=cpt&title=USATODAY.com+-+Jap . . . >, 3 pages.
Korousic, Bojan et al.; "3rd Year Project Report EZ-Ca$h: Feasibility Project," 2003, Electronics Engineering Technology—Telecommunications Systems, Conestoga College, 33 pages.
Subramanian, Hemang C.; "SIM Access Profile: Electronic currency using SIM Access Profile," [online] 2003. [Retrieved on Jul. 1, 2007]. Retrieved from the internet <URL: http:/www-128.ibm.com/developerworks/wireless/library/wi-simacc/>, 6 pages.

(56) References Cited

OTHER PUBLICATIONS

"Ubiquitous Commerce"; [online]. [Retrieved on 07-01-24] Retrieved from the internet <URL: http://www.accenture.com/Global/Services/Accenture_Technology_Labs/R_and_I/Mobile . . . > 2 pages.
"M Pay: Frequently Asked Questions, "[online]. [Retrieved on 07-01-24]. Retrieved from the internet <URL: http://www.m-pay.com/index.php?id=18> , 5 pages.
"GSMVend Technical Manual"; [online]. [Retrieved on Jul. 3, 2016]. Retrieved from the internet <URL: http://www.bonusdata.net/IntusJunior/GSMVend/gsmvend.htm>, 14 pages.
U.S. Appl. No. 11/749,366, filed May 16, 2007.
U.S. Appl. No. 11/767,033, filed Jun. 22, 2007.
U.S. Appl. No. 11/963,736, filed Dec. 21, 2007.
U.S. Appl. No. 11/963,095, filed Dec. 21, 2007.
U.S. Appl. No. 11/962,836, filed Dec. 21, 2007.
U.S. Appl. No. 12/491,139, filed Jun. 24, 2009.
International Search Report from International Application No. PCT/US2008/077688 dated Dec. 2, 2008.
International Preliminary Report on Patentability from International Application No. PCT/US2007/088653 dated Jun. 30, 2009.
U.S. Appl. No. 12/491,143, filed Jun. 24, 2009.
International Search Report and Written Opinion of the International Searching Authority from International Application No. PCT/US2007/088687 dated May 12, 2008, 10 pages.
U.S. Appl. No. 11/960,162, filed Dec. 19, 2007.
U.S. Appl. No. 11/960,173, filed Dec. 19, 2007.
Supplementary European Search Report for Application No. EP09771121.2, dated Apr. 16, 2012, 10 pages.
Schreiner, Keri; "Where We at? Mobile Phones Bring GPS to the Masses"; 2007, *IEEE Computer Graphics and Applications*, pp. 6-11.
Search/Examination Report dated Feb. 5, 2010 from International Application No. PCT/US2009/048813, 11 pages.

* cited by examiner

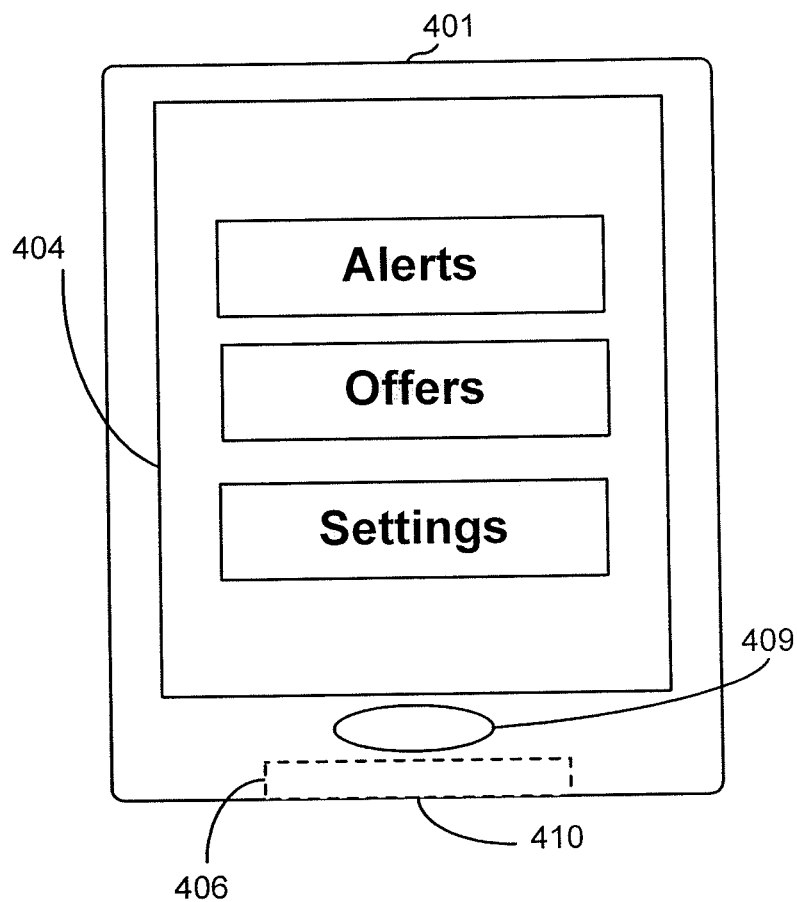
FIG. 4A(1)

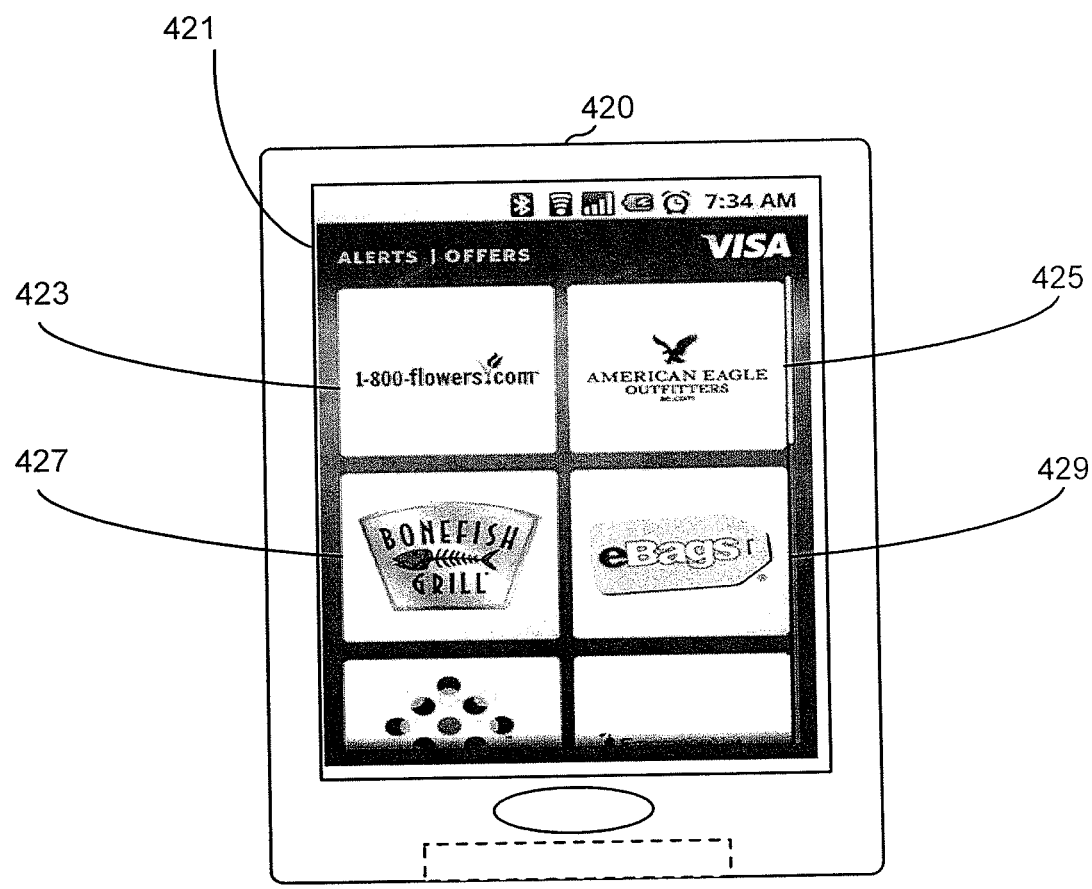
*FIG. 4A(2)*

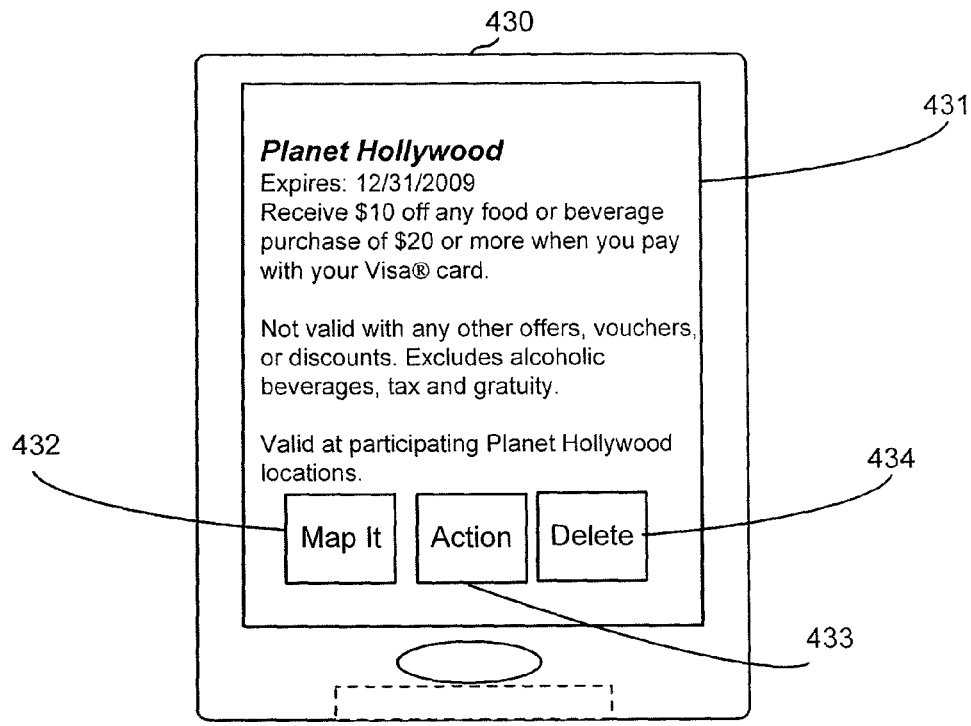
FIG. 4A(3)
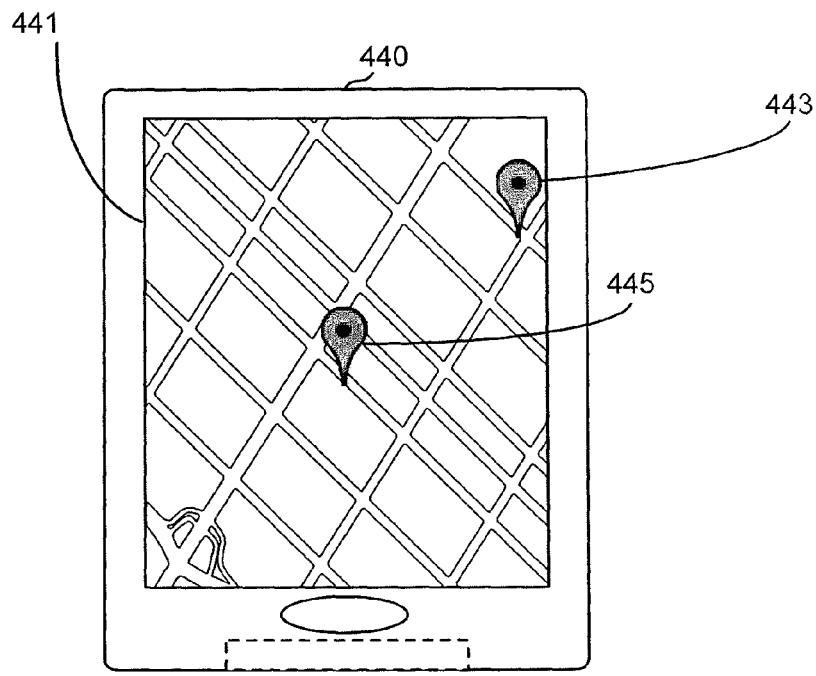
FIG. 4A(4)

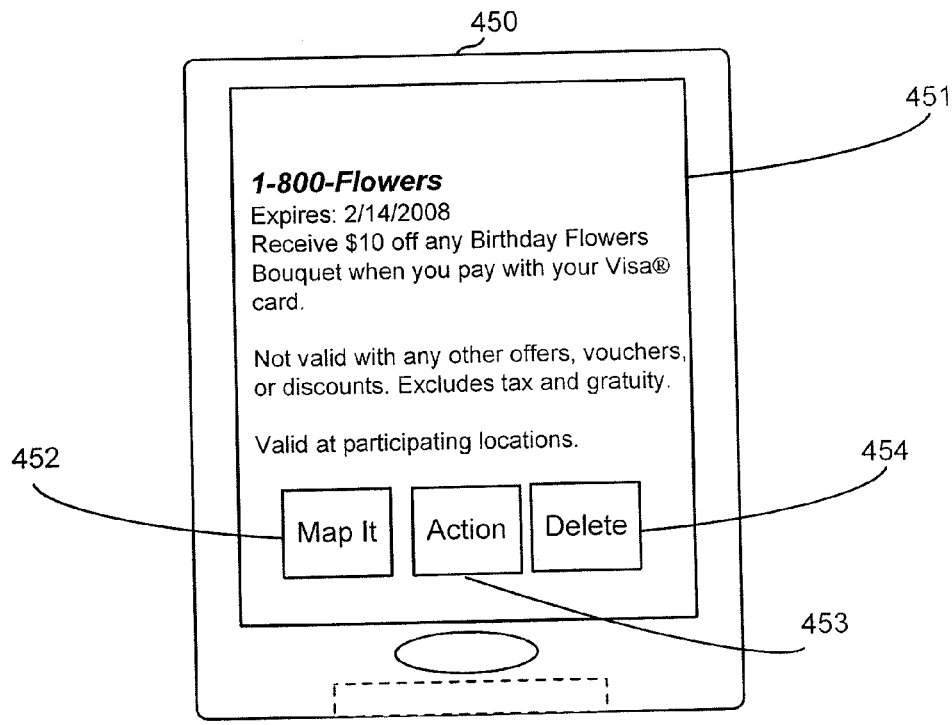
FIG. 4B(1)
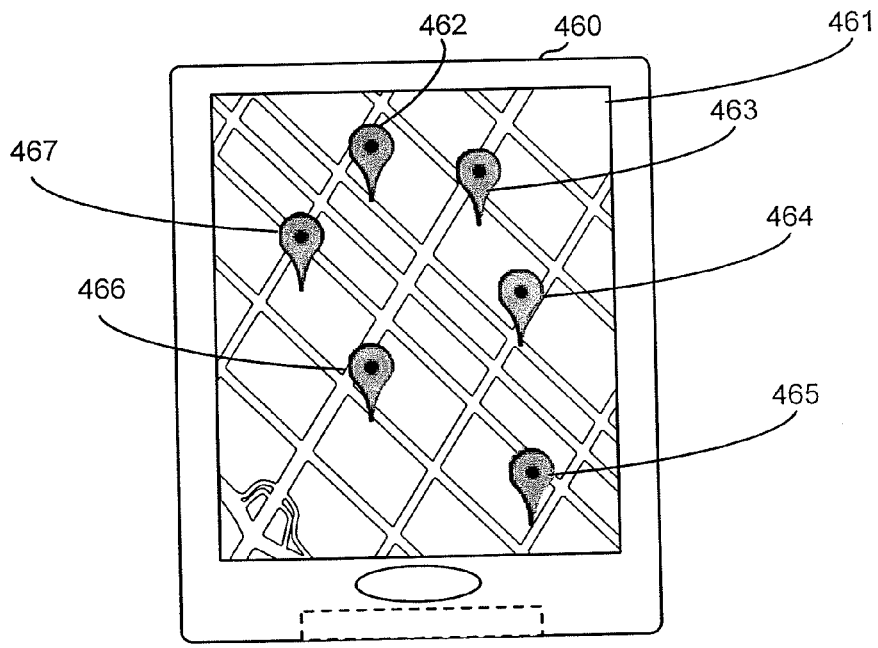
FIG. 4B(2)

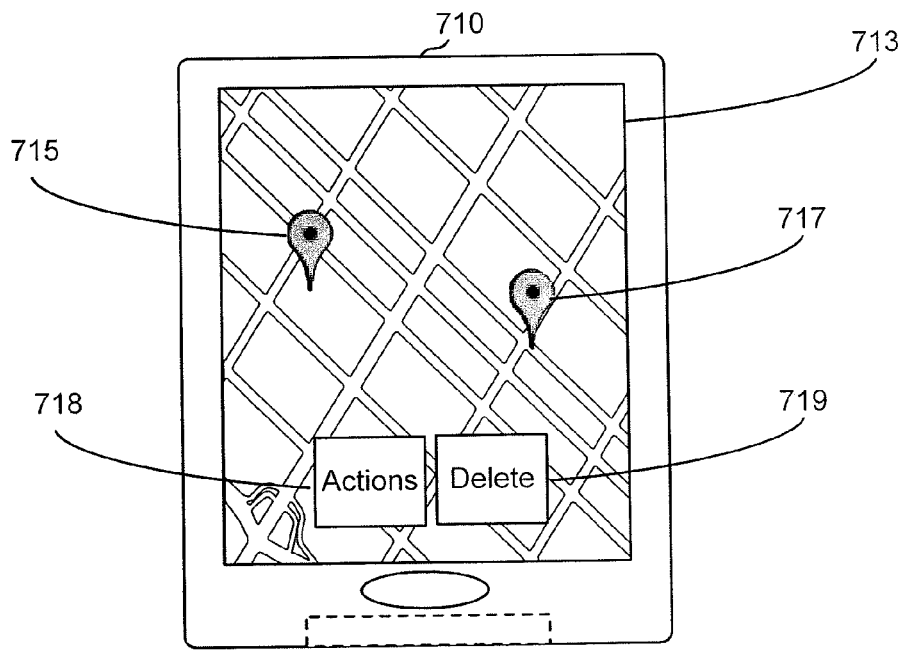
FIG. 7A(1)
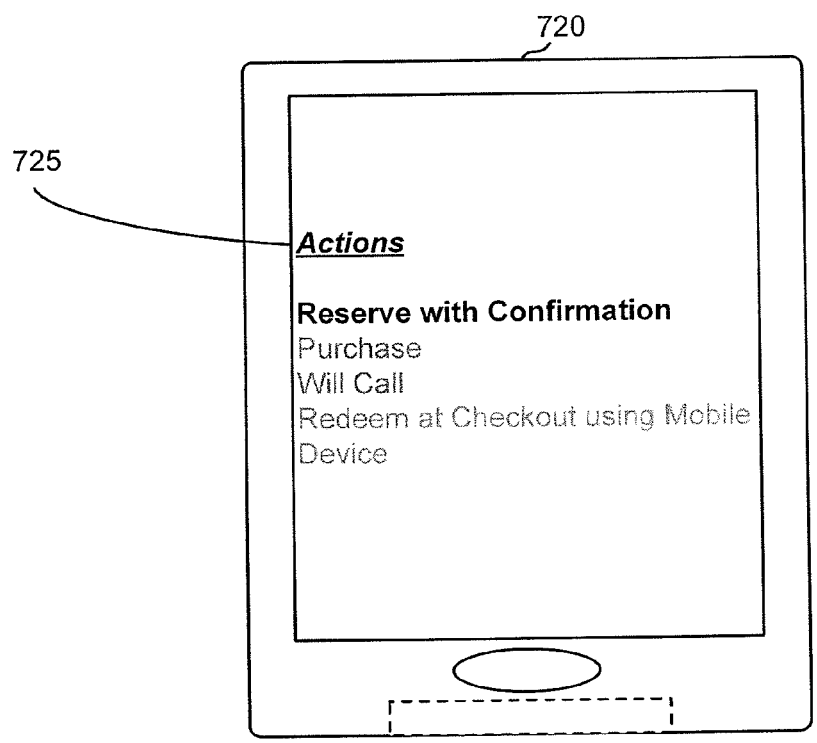
FIG. 7A(2)

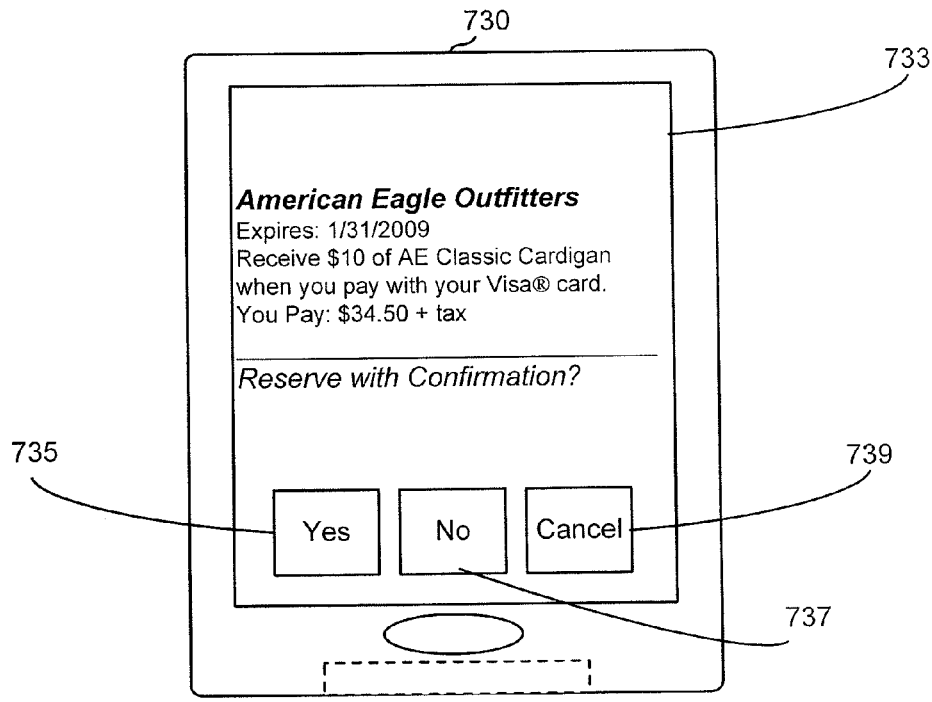
FIG. 7B(1)
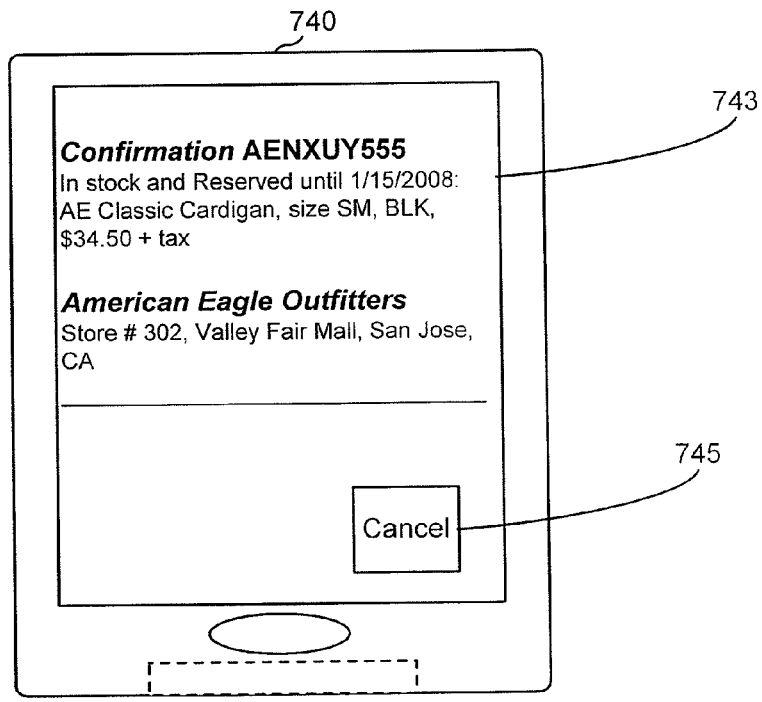
FIG. 7B(2)

SYSTEMS AND METHODS FOR VISUAL REPRESENTATION OF OFFERS

CROSS-REFERENCES TO RELATED APPLICATIONS

The present application is a non-provisional application of and claims priority to U.S. Provisional Application No. 61/076,099, filed on Jun. 26, 2008, the entire contents of which are herein incorporated by reference for all purposes.

BACKGROUND OF THE INVENTION

Targeted offers such as coupons are a useful marketing tool to enhance brand loyalty and introduce new products. By customizing an offer to a consumer based on purchasing patterns and preferences, the offer provides a targeted incentive for the consumer to purchase a particular product or line of products.

Conventionally, offers have been available in printed form from sources such as newspapers. Increased adoption of electronic sources of information such as the world-wide-web, however, has led to the increase in popularity of electronic offers.

In addition, most consumers now own and operate a cell phone or other portable electronic device. This renders such consumers accessible to the distribution of electronic offers as they do their shopping, or are otherwise mobile. After distribution, the targeted offers may be redeemed. Such systems require knowledge of the nearest store locations where the offer can be redeemed. Moreover, the targeted offers are typically redeemed only at the physical store location. Recent developments in offer redemption permit offers to be redeemed for online purchases. In these systems, consumers are required to wait for delivery of the goods purchased using the offer. There is no way for consumers to redeem offers using their portable electronic device and to collect the goods or services at the physical store location. These and other drawbacks and limitations exist with respect to existing targeted offer distribution systems.

Embodiments of the invention address these and other problems individually and collectively.

BRIEF SUMMARY OF THE INVENTION

Embodiments of the invention are directed to improved consumer notification systems and methods. In particular, a method and system for providing visual representation of purchase offers targeted to a consumer are disclosed.

One embodiment of the invention is directed to a method including monitoring for an event to trigger a targeted offer. Upon detection of the event, the offer is generated. The offer is targeted to a consumer and is generated using payment data generated in response to transactions conducted by the consumer with a plurality of different merchants. A geographic location for redeeming the offer is determined. A notification message is generated about the offer. The notification message includes the offer and the geographic location for redeeming the offer. The notification message is sent to a notification device which is operated by the consumer. A graphical depiction of the offer is displayed on a map on the notification device.

Another embodiment of the invention is directed to a notification device having a processor, an antenna coupled to the processor, and a computer readable medium coupled to the processor, the computer readable medium comprising code executable by the processor, the code comprising code for receiving an offer targeted to a consumer based on payment data generated in response to transactions conducted by the consumer with a plurality of different merchants, the notification device operated by the consumer, and code for generating a map comprising a graphical depiction of the offer and a graphical depiction of a geographic location for redeeming the offer, wherein the offer is received by the notification device upon detection, by a payment processing server, of a triggering event.

Another embodiment of the invention is directed to a system that includes a payment processing network configured to monitor for an event to trigger a targeted offer, generate the offer upon detection of the event, the offer targeted to a consumer, wherein the offer is generated using payment data generated in response to transactions conducted by the consumer with a plurality of different merchants, and determine a geographic location for redeeming the offer. The system also includes a notification module coupled to the payment processing network, the notification module configured to generate a notification message about the offer, the notification message including the offer and the geographic location for redeeming the offer, and send the notification message to a notification device operated by the consumer, wherein a graphical depiction of the notification message is displayed on a map on the notification device.

Accordingly, a method and system allowing for the redemption of electronic targeted offers by mobile electronic devices, such as a notification device, is disclosed.

Yet another embodiment of the invention is directed to a machine-readable storage medium storing a sequence of instructions execution of which causes a processor to provide notifications of targeted purchase offers, the execution of the sequence of instructions causes the processor to perform the actions of: monitoring for an event to trigger a targeted offer; generating the offer upon detection of the event, the offer targeted to a consumer, wherein the offer is generated using payment data generated in response to transactions conducted by the consumer with a plurality of different merchants, determining a geographic location for redeeming the offer, generating a notification message about the offer, the notification message including the offer and the geographic location for redeeming the offer, and sending the notification message to a notification device operated by the consumer, wherein a graphical depiction of the offer is displayed on a map on the notification device based on the notification message.

Other embodiments of the invention are directed to computer readable media comprising code for performing the above-described methods as well as systems, apparatuses and devices that perform the methods and/or that use the computer readable media.

These and other embodiments of the invention are described in further detail below.

BRIEF DESCRIPTION OF THE DRAWINGS

FIG. 4A(1) is a schematic drawing of a notification device displaying an exemplary graphical user interface according to an embodiment of the invention.

FIG. 4A(2) is another schematic drawing of a notification device displaying an exemplary graphical user interface according to an embodiment of the invention.

FIG. 4A(3) is yet another schematic drawing of a notification device displaying an exemplary graphical user interface according to an embodiment of the invention.

FIG. 4A(4) is a schematic drawing of a notification device for displaying an exemplary map with a graphic representation of a geo-location of the selected notification according to an embodiment of the invention.

FIG. 4B(1) is a schematic drawing of a notification device for displaying an exemplary graphical user interface according to an embodiment of the invention.

FIG. 4B(2) is a schematic drawing of a notification device for displaying an exemplary map with a graphic representation of a geo-location of the selected notification according to an embodiment of the invention.

FIG. 7A(1) is a schematic drawing of a notification device for displaying an exemplary map with a graphic representation of a geo-location of the selected notification according to an embodiment of the invention.

FIG. 7A(2) is a schematic drawing of a notification device for displaying actions associated with the selected notification according to an embodiment of the invention.

FIG. 7B(1) is a schematic drawing of a notification device for displaying a selected action according to an embodiment of the invention.

FIG. 7B(2) is a schematic drawing of a notification device for displaying a confirmation page according to an embodiment of the invention.

DETAILED DESCRIPTION OF THE INVENTION

Figure 1A:
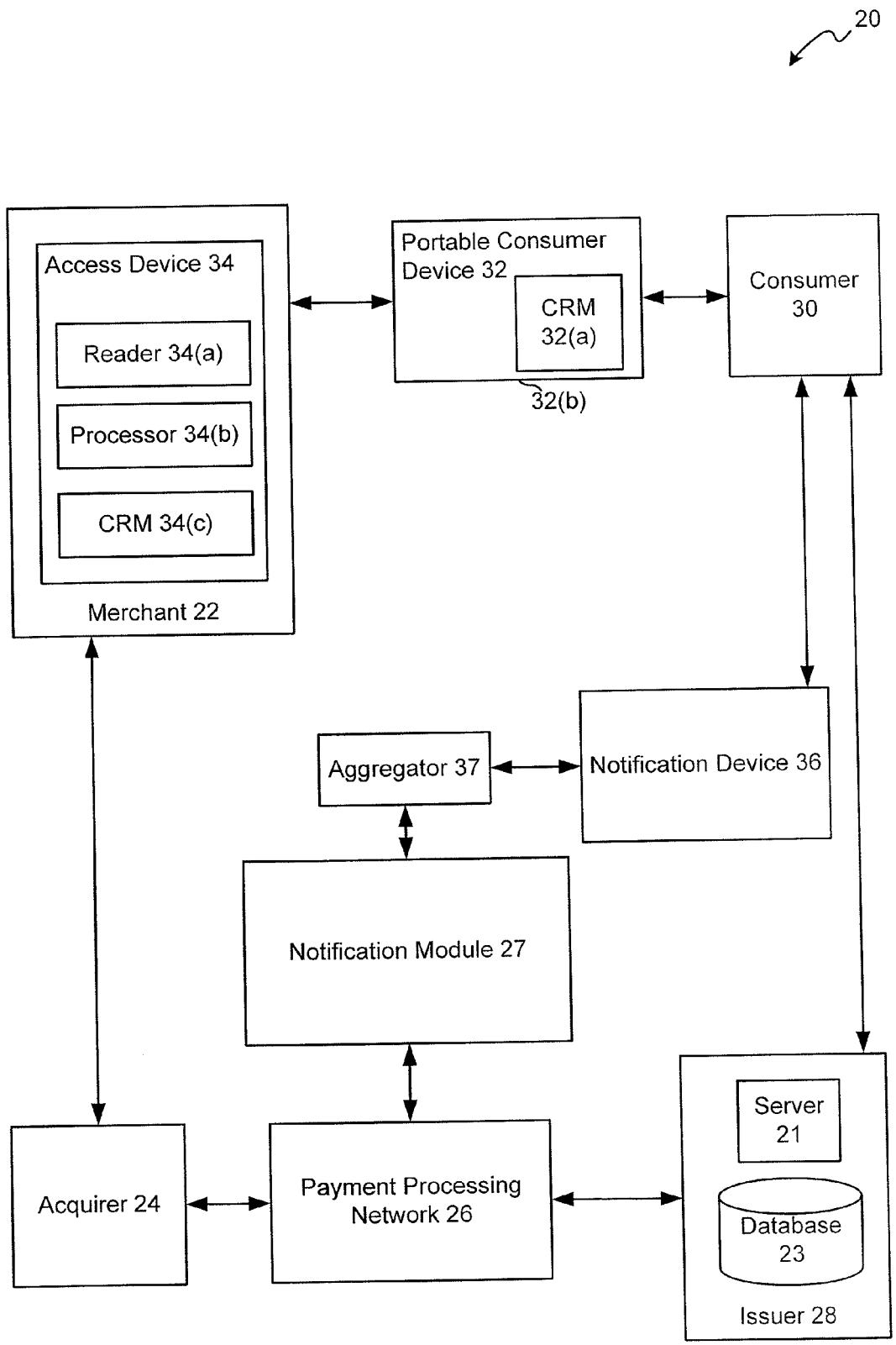
FIG. 1A is a block diagram of a payment processing system according to an embodiment of the invention.

Embodiments of the invention are directed to a method of providing, on a consumer's notification device, a visual representation of purchase offers targeted to the consumer. A notification is triggered upon detection of an event. Once triggered, a targeted offer, map, and one or more location icons indicating the geographic locations for redeeming the targeted offer are determined and delivered as a notification to the notification device if the consumer is enrolled to receive the notification. The map and location icons of the notification are displayed on the consumer's notification device. The visual representation of the redemption location on a map enables the consumer to quickly ascertain where the offer can be redeemed.

Certain embodiments of the invention may provide one or more technical advantages to merchants and consumers. One technical advantage is that the consumer is shown the geographic location (geo-location) of a location (i.e., redemption location) where the targeted offer can be redeemed. The consumer need not know or research all of the locations where the targeted offer can be redeemed. As described herein, a consumer is provided with a notification that includes a targeted offer and graphic representations of a geo-location of a redemption location. For example, a map with a carrot or icon relative to the map that points to the exact physical location where the targeted offer can be redeemed may be provided. The visual depiction of the redemption location provides the consumer with meaningful information. There is a better chance of the consumer to make a purchase if the redemption locations are known by the consumer.

Another advantage is the timeliness of the targeted offer. Targeted offers are generated based on the most up-to-date historical purchasing data available for each individual consumer. As such, the targeted offers are directly relevant to consumer's current spending habits and preferences. Various prior art systems require merchants to provide transaction data to the system generating the offers. Typically, the transaction data is sent only on a monthly or quarterly basis. Thus, the offers are generated based on stale data which may be irrelevant to the current preferences of the consumer.

Another advantage is the accuracy of the terms of the targeted offer and locations for redemption of the offer. The offer terms may specify particular goods or services as subjects of the offer provided by a merchant, original price of the goods or services, a discounted price, etc. By interfacing with the merchant systems when generating the targeted offer, the terms and redemption locations are highly likely to be accurate. For example, a targeted offer may identify a particular item that is the subject of the offer. Redemption locations where the targeted offer can be redeemed may be identified. In one embodiment, the redemption locations are identified by using the merchant system which checks current inventories and stock levels. Where the inventories fall below a threshold at a particular location, that location is not identified as a valid redemption location. As such, consumers are only notified about locations that can actually honor the offer.

Furthermore, by interfacing with the merchant systems, there is little overhead for providing accurate targeted offers and redemption locations. The system generating the targeted offers need not bear the cost of keeping track of the inventories and stock of each physical location of multiple merchants.

Yet another advantage is the ability to take immediate action on the targeted offer using a portable electronic device of the consumer. Actions to be performed on a targeted offer may include one or more of the following: reserve with confirmation, purchase, set for will call, and redeem at checkout using mobile device. The actions may then be immediately acted upon by the payment processing network and the merchant systems. A graphical user interface (GUI) may provide these action options to the consumer thus allowing the consumer to act upon the targeted offer quickly and easily. The consumer need only select an action and the payment processing system immediately fulfills the action. In contrast, typical systems permit offers to be redeemed using mobile devices only for online purchases. In these systems, consumers are required to wait for delivery of the goods purchased using the offer. As described herein, consumers can redeem offers using their portable electronic device and can immediately collect the goods or services at the merchant's physical store location.

Certain embodiments of the invention may include none, some, or all of the above technical advantages. One or more other technical advantages may be readily apparent to one skilled in the art from the figures, descriptions, and claims included herein.

The systems and methods as described herein may be used in the context of payment transactions using payment processing systems, which are configured to process credit and debit card transactions. Further, embodiments of the invention are directed to the use of notification devices, and methods and systems that use them. The notification devices can be used in payment processing systems like those shown in FIG. 1(a).

I. Providing Notification Device with Geo-Location of Targeted Offer

FIG. 1(a) is a system 20 that can be used in an embodiment of the invention. For simplicity of illustration, one merchant, one issuer, one acquirer, one portable consumer device, one notification device, and one consumer are shown. It is understood however, that embodiments of the invention may include multiple merchants, issuers, acquirers, portable consumer devices, notification devices, and/or consumers. In addition, some embodiments of the invention may include fewer than all of the components shown in FIG. 1(a). Also, the components in FIG. 1(a) may communicate via any suitable communication medium (including the Internet), using any suitable communication protocol.

The system 20 includes a merchant 22 and an acquirer 24 associated with the merchant 22. In a typical payment transaction, a consumer 30 may purchase goods or services at the merchant 22 using a portable consumer device 32, such as a credit card. The payment transaction may occur at one or more transaction locations involving merchant 22, portable consumer device 32, and consumer 30. The acquirer 24 can communicate with an issuer 28 via a payment processing network 26, which provides the acquirer 24 with a transaction authorization response. The payment processing network 26 can also provide targeted offers to consumer 30.

As used herein, a targeted offer is an offer to purchase goods, services, or other subjects. Targeted offers may be based on, among other things, one or any combination of the following: purchase history of previous purchases made with a portable consumer device, purchase patterns determined from historical purchase records for a consumer, and the like. Targeted offers may include an item description (product name, size, color, model, manufacturer, etc.), an amount of a discount, limited time price, original price, information about the issuing merchant, expiration date, issue date, restrictions, method of valid redemption, and the like.

Additionally, payment processing network 26 communicates with a notification device 36 via notification module 27, which provides notifications of targeted offers and is responsible for notifying consumers of the possibility of fraudulent transactions and other alerts.

The acquirer 24 is typically a bank that has a merchant account. The issuer 28 may also be a bank, but could also be business entity such as a retail store. Some entities are both acquirers and issuers, and embodiments of the invention include such entities. The issuer 28 may operate a server computer 21, which may have a computer readable medium comprising code for performing the functions that the issuer 28 performs. A database 23 comprising account number information and other information may be operatively coupled to the server computer 21.

The consumer 30 may be an individual, or an organization such as a business that is capable of purchasing goods or services. In one embodiment, consumer 30 may be one or more individuals who are authorized to use portable consumer device 32.

The portable consumer device 32 may be in any suitable form. For example, suitable portable consumer devices can be hand-held and compact so that they can fit into a consumer's wallet and/or pocket (e.g., pocket-sized). They may include smart cards, ordinary credit or debit cards (with a magnetic strip and without a microprocessor), keychain devices (such as the Speedpass™ commercially available from Exxon-Mobil Corp.), etc. Other examples of portable consumer devices include cellular or mobile phones, personal digital assistants (PDAs), pagers, payment cards, security cards, access cards, smart media, transponders, and the like. The portable consumer devices can also be debit devices (e.g., a debit card), credit devices (e.g., a credit card), or stored value devices (e.g., a stored value card).

The portable consumer device 32 may comprise a computer readable medium (CRM) 32(a) and a body 32(b). The computer readable medium 32(a) may be on the body 32(b). The body 32(b) may in the form a plastic substrate, housing, or other structure. The computer readable medium 32(a) may be a memory that stores data and may be in any suitable form. Exemplary computer readable media 32(a) may be in any suitable form including a magnetic stripe, a memory chip, etc. If the portable consumer device 32 is in the form of a card, it may have an embossed region 32(a) which is embossed with a PAN (primary account number).

The payment processing network 26 may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

The payment processing network 26 may also include a mobile targeting module that is responsible for generating offers targeted to a user. According to certain embodiments, the offers can be targeted based upon a location based services (LBS) approach, utilizing prior purchasing activity by a consumer as detected over a payment processing network. Analytical analysis may be performed on the prior purchasing activity to determine purchasing preferences and patterns which in turn can be used to generate the targeted offers. The prior purchasing activity may include all purchase transactions made using portable consumer device 32. The prior purchasing activity may encompass transactions across multiple merchants. This provides an enriched dataset upon which analytical analysis is performed producing more accurate forecasts of purchasing preferences and patterns.

The payment processing network 26 may include a server computer. A "server computer" or "server" is typically a powerful computer or cluster of computers. For example, the server computer can be a large mainframe, a minicomputer cluster, or a group of servers functioning as a unit. In one example, the server computer may be a database server coupled to a Web server. The payment processing network 26 may use any suitable wired or wireless network, including the Internet.

Merchant 22 may also have, or may receive communications from, an access device 34 that can interact with the portable consumer device 32. In FIG. 1(a), the access device 34 is located at the merchant 22. However, it could be located at any other suitable location in other embodiments of the invention.

The access devices according to embodiments of the invention can be in any suitable form. Examples of access devices include point of sale (POS) devices, cellular or mobile phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like.

If the access device 34 is a point of sale terminal, any suitable point of sale terminal may include a reader 34(*a*), a processor 34(*b*) and a computer readable medium 34(*c*). The reader 34(*a*) may include any suitable contact or contactless mode of operation. For example, exemplary card readers can include RF (radio frequency) antennas, magnetic stripe readers, etc. to interact with the portable consumer device 32.

System 20 also includes notification module 27 for processing notifications. Notification module 27 may include various subsystems which enroll one or more consumers, such as consumer 30, into a program for receiving targeted offers. Notification module 27 may also generate notifications, for example, notifications of targeted offers. These notifications may be generated to include the targeted offer, location icons identifying the locations where the offer can be redeemed, and/or a map upon which the location icons may be displayed. As such, the notifications provide the geo-locations of redemption locations where the offer can be redeemed. Notification module 27 is communicatively coupled to payment processing network 26 and an aggregator 37.

Aggregator 37 collects and forwards notifications from notification module 27 to notification device 36. Aggregator 37 may be an entity or organization that receives and transmits messages to a phone, email account, etc. In some cases, wireless telephone companies may be considered aggregators.

Notification device 36 refers to any suitable device for receiving notifications and for providing the notifications to consumer 30. Notifications refer to communications of information relating to a purchase offer targeted to consumer 30 which is presented on a display of notification device 36. As used herein, a notification includes a targeted offer, a map or other graphic representation of a geographic area, and/or a location icon (i.e., a carrot, marker, etc.) which is a graphical indication of the location where the offer can be redeemed. A targeted offer is in the form of textual information about the terms of the offer.

Notifications may be in any suitable form and may be delivered by any suitable method. Some examples of notifications include a phone call, a voice message, a voicemail message, a short message service (SMS) message, e.g., a text message, an instant messaging (IM) message, an email message, or a periodically updated display on a device. An exemplary embodiment of a notification is a purchase offer targeted to a consumer. The targeted offer is a communication to notify consumer 30 of the terms of the offer.

Figure 1B:
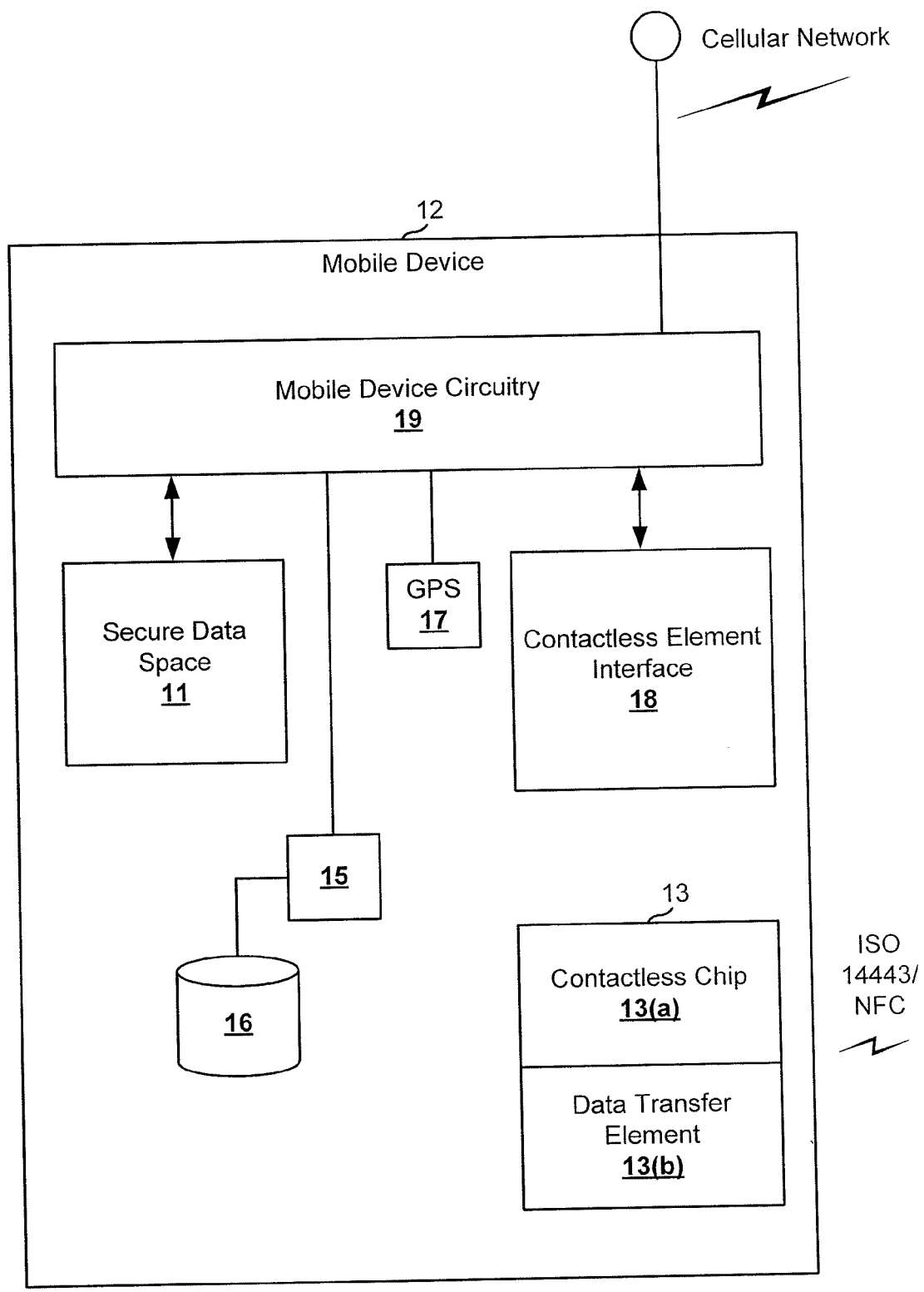
FIG. 1B is a block diagram of an exemplary notification device.

Notification device 36 may be in any suitable form. For example, suitable notification devices 36 can be hand-held and compact so that they can fit into a consumer's wallet and/or pocket (e.g., pocket-sized). Some examples of notification device 36 include mobile phones (e.g., as shown in FIG. 1B), personal digital assistants (PDAs), and the like. In some embodiments, notification device 36 and portable consumer device 30 are embodied in the same device.

In a typical purchase transaction, the consumer 30 purchases a good or service at the merchant 22 using a portable consumer device 32 such as a credit card. The consumer's portable consumer device 32 can interact with an access device 34 such as a POS (point of sale) terminal at the merchant 22. For example, the consumer 30 may swipe a credit card through an appropriate slot in the POS terminal. Alternatively, the POS terminal may be a contactless reader, and the portable consumer device 32 may be a contactless device such as a contactless card. In certain embodiments, the portable consumer device may be a mobile device such as shown in FIG. 1A above. As described in detail below, the antenna of the mobile device may be utilized to communicate not only payment information to the POS, but also may also communicate information (such as a code) from a mobile offer to a POS device.

An authorization request message is then forwarded to the acquirer 24. After receiving the authorization request message, the authorization request message is then sent to the payment processing network 26. The payment processing network 26 then forwards the authorization request message to the issuer 28 of the portable consumer device 32.

After the issuer 28 receives the authorization request message, the issuer 28 sends an authorization response message back to the payment processing network 26 to indicate whether or not the current transaction is authorized. The payment processing network 26 then forwards the authorization response message back to the acquirer 24. The acquirer 24 then sends the response message back to the merchant 22.

After the merchant 22 receives the authorization response message, the access device 34 at the merchant 22 may then provide the authorization response message for the consumer 30. The response message may be displayed by the access device 34 or the portable consumer device 32, or may be printed out on a receipt.

At the end of the day, a normal clearing and settlement process can be conducted by the payment processing network 26. A clearing process is a process of exchanging financial details between and acquirer and an issuer to facilitate posting to a consumer's account and reconciliation of the consumer's settlement position.

In one embodiment, payment processing network 26 may monitor and detect an offer event. As used herein, an offer event is an event which triggers the generation of targeted offers. Upon the detection of the offer event, payment processing network 26 may be triggered to generate targeted offers.

Offer events may have any suitable characteristics. In some cases, a targeted offer may be triggered by the initiation or completion of a transaction on an account associated with portable consumer device 32. In another example, targeted offers are generated on a periodic basis and/or on-going basis. Other examples of offer events include the following: a request for a targeted offer initiated by consumer 30 or other suitable entity, and a geographic location of consumer 30, as determined by the geo-location of notification device 36, being within proximity to a target location. In one embodiment, a geo-location of the notification device is compared with a geo-location of a target location, and it may be determined that consumer 30 has traveled in a proximity to the target location based on the comparison. For example, consumer 30 may be physically near a retail shop or location. Payment processing network 26 may be triggered to generate a targeted offer upon detection of consumer's 30 proximity to the retail shop. Offer events may be specified by merchant 22, consumer 30, by default, or other suitable entity. Thus, embodiments of the invention are flexible enough to allow for many types of offer events.

In one embodiment, notification module 27 may be triggered by payment processing network 26 to send a notification of the targeted offer. Notification module 27 receives the targeted offer generated by payment processing network 26. Notification module 27 determines whether consumer 30 should be notified about the targeted offer, and generates and sends a notification to consumer 30 via aggregator 37 and notification device 36.

Some of the embodiments described below may use a payment processing system like the one described above, or any suitable combination of components in the payment processing system.

FIG. 1B is a block diagram of an exemplary notification device 12. In one embodiment, notification device 12 is a portable (mobile) device.

Device 12 further includes a contactless element 13, typically implemented in the form of a semiconductor chip 13(a) (or other data storage element) with an associated wireless data transfer (e.g., data transmission) element 13(b), such as an antenna. Contactless element 13 is associated with (e.g., embedded within) mobile device 12 and data such as a targeted offer or control instructions transmitted via cellular network may be applied to contactless element 13 by means of contactless element interface 18. Contactless element interface 18 functions to permit the exchange of data and/or control instructions between the mobile device circuitry 19 (and hence the cellular network) and contactless element 13.

Mobile device 12 may also include a secure data space 11, which may be used by the device to store operating parameters and/or other data utilized in operation of the device. The secure data space 11 may be in the form of a chip that is separate and apart from the chip in the contactless element 13, or alternatively, could be a section of memory in the chip that forms part of the contactless element 13. Note that the chip in the contactless element 13 may include data storage capability in the form of a memory that may be accessed via interface 18 to permit the implementation of read, write, and erase functions, for example.

In accordance with still other embodiments, the mobile device may further include a processor 15 and computer readable storage medium 16 for storing code and configured to direct the processor to perform various tasks. For example, the computer readable storage medium may comprise a magnetic disk drive or a flash memory chip.

As discussed below, the computer readable storage medium may contain code that is configured to cause a processor of the portable consumer device to receive and recognize a message including a notification and code that is delivered to the mobile device. The computer readable storage medium may also include code that is configured to decrypt an encrypted message including the code that is received by the mobile device.

Contactless element 13 is capable of transferring and receiving data using a near field communications capability (or near field communications medium) typically in accordance with a standardized protocol or data transfer mechanism (identified as ISO 14443/NFC in the figure). Near field communications capability is a short-range communications capability, such as RFID, Bluetooth™, infra-red, or other data transfer capability that can be used to exchange data between the mobile device 12 and a local apparatus, for example located a point-of-sale of a merchant or another location at which targeted offers are expected to be redeemed. Thus, mobile device 12 is capable of communicating and transferring data and/or control instructions via both cellular network and near field communications capability.

In accordance with certain embodiments, the mobile device further includes a Global Positioning System (GPS) element 17. GPS element 17 is configured to allow determination of the location of the user at any time. In particular, GPS element 17 relies upon signals from a plurality of orbiting satellites in order to allow the user's location to be determined. Location information obtained from the GPS element 17 may in turn be communicated through the antenna to allow monitoring of the user's position.

II. Infrastructure for Providing Geo-Location Notifications for Targeted Offers

Embodiments of the invention are directed to geo-location notifications for targeted offers. In these embodiments of the invention, the system may provide a consumer with a notification about a targeted offer upon occurrence of an offer event. When the notification is viewed, a notification device of the consumer displays a graphical representation of the notification on a map. For example, upon occurrence of an offer event, the system may provide to a phone or other notification device of the consumer, a notification including an offer, a map and/or an icon indicating the location of where the offer can be redeemed. The visual representation of the redemption location on the map enables the consumer to quickly ascertain where the offer can be redeemed. For example, the representation of the geo-location of the notification may indicate to the consumer one or more redemption locations within a five mile proximity to the consumer.

Figure 2:
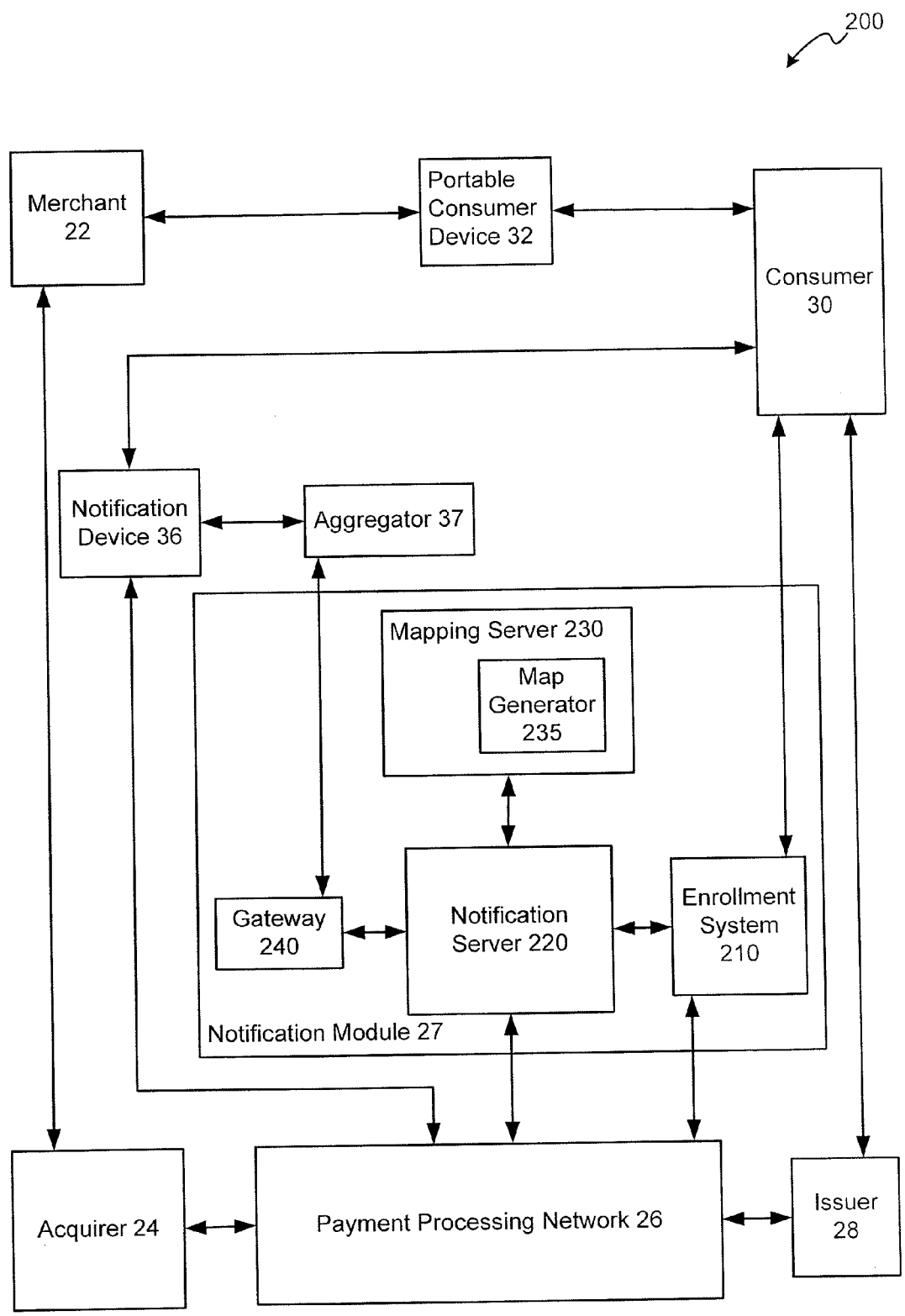
FIG. 2 is a block diagram of a payment processing system according to an embodiment of the invention.

FIG. 2 is a block diagram of payment processing system 200 according to an embodiment of the invention. System 200 includes merchant 22, acquirer 24 associated with the merchant 22, portable consumer device 32, and consumer 30. Acquirer 24 can communicate with an issuer 28 via a payment processing network 26. Payment processing network 26 can also communicate with a notification device 36 via aggregator 37 and notification module 27, which provides notifications of targeted offers.

Payment processing network 26 is configured to generate offer information and is communicatively coupled with merchant 22 through acquirer 24. Offer information includes one or more targeted offers and/or geo-locations of locations where the offer(s) can be redeemed. For example, during or after generation of an offer, payment processing network 26 may determine locations where the offer can be redeemed. These redemption locations may be affiliated with merchant 22. For example, the redemption locations may be retail locations of the merchant 22.

In one embodiment, payment processing network 26 sends a request to merchant 22 via acquirer for one or more redemption locations affiliated with merchant 22. Merchant 22 may provide to payment processing network 26 identification (ID) of the one or more redemption locations via acquirer 24. The IDs of the one or more redemption locations may be in the form of a geo-locations of the redemption location or another form of identification. Payment processing network 26 determines the geo-location of the redemption locations using the received IDs. For example, a store ID is received. The store ID may be a number or other unique identifier assigned to a store that is associated with merchant 22. Payment processing network 26 may perform a look-up on a table using the store number as a search key into the table. The table may associate the store number with the geo-location of the redemption location.

In one embodiment, merchant 22 identifies each of its locations where the offer can be redeemed. For example, if a targeted offer presents a red coat for a sale price, merchant 22 may check stock for the red coat at various locations, and identify only those locations that have a minimum stock of the red coat. Since merchant 22 has the most updated information about the inventories and stock of each of its store locations, consumer 30 can trust that the stores identified by merchant 22 will actually honor the targeted offer.

In another embodiment, payment processing network 26 may store the geographic locations of a plurality of merchants. Payment processing network 26 may determine which of the stored redemption locations can redeem the targeted offer. Rules may also be applied to narrow the redemption locations to those which are within a threshold distance from a target location, such as the geo-location or position of consumer 30, a city center, etc. Rules may indicate the threshold distance and may also indicate how the threshold distance is to be further expanded, for example if there are no redemption locations within a default radius from the position of the consumer, the threshold distance may be expanded. The threshold distance may be narrowed, for example if there are too many redemption locations within a default radius. In one embodiment, one or more retail establishments are identified as locations where the offer can be redeemed. Rules may be applied to include only those retail establishments that are within a predetermined proximity to consumer 30. The geographic locations of the narrowed set of retails establishments are determined. Other methods of determining a geo-location of the redemption locations may be used. The offer information is provided by payment processing network 26 to notification module 27.

In one embodiment, notification module 27 may be triggered by payment processing network 26 to send a notification of the targeted offer. Notification module 27 receives the targeted offer generated by payment processing network 26. Notification module 27 determines whether consumer 30 should be notified about the targeted offer.

Notification module 27 includes an enrollment system 210, a notification server 220, a mapping server 230, and a gateway 240. Enrollment system 210 is in communication with consumer 30, payment processing network 26, and notification server 220. Notification server 220 is in communication with gateway 240, mapping server 230, and payment processing network 26. Although enrollment system 210 is shown as being separate from issuer 28, enrollment system 210 can be at issuer 28 in some embodiments.

Before a consumer receives notifications, the consumer can register with enrollment system 210 for enrolling in a targeted offer distribution program. Consumer 30 may register for notifications of targeted offers or update existing notifications in any number of ways. For example, consumer 30 can register via a separate website designed for this purpose, or manually though a paper form (which may be considered a registration interface). Issuer 28 or payment processing network 26 may also enroll consumer 30 automatically for notifications of targeted offers.

Enrollment system 210 receives enrollment information from consumer 30, for example, via a web interface using a computer, or from issuer 28 and may store the enrollment information in a database. Enrollment system 210 may provide the enrollment information to a system which will be detecting the offer event so that the system knows what events to monitor before a targeted offer is generated for consumer 30. The enrollment information may be provided on demand (e.g., when consumer 30 makes a change), periodically (e.g., hourly, daily, etc.), or on an individual request basis, and using a push or pull scheme. In one embodiment, the system detecting the offer event is payment processing network 26. In another embodiment, the system detecting the offer event may be issuer 28.

Enrollment information includes details of offer events that describe the conditions that must take place to trigger the generation of targeted offers, updated enrollment information, and other account information. Consumer 30 may define the offer events when enrolling in a program to receive notifications. In alternative embodiments, the offer events are predetermined by the system, for example, such that consumer 30 can enroll by opting into the notification program with minimal input.

The enrollment information may also specify the types of offers that consumer 30 is interested in receiving. For example, consumer 30 may indicate an interest in receiving offers from particular merchants, such as Starbucks®. Consumer 30 may indicate preferences in receiving offers for certain products, such as coffee. Types of offers may be specified in various other ways.

Notification server 220 generates and processes notifications with graphic representations of a geo-location of a targeted offer and is in communication with payment processing network 26, enrollment server 210, mapping server 230, and gateway 240. Notification server 220 may receive offer information from payment processing network 26. As previously described, offer information includes one or more targeted offers and/or geo-locations of redemption locations.

In embodiments of the invention, notification server 220 and/or a server in the payment processing network 26 may comprise a processor, and a computer readable medium. The computer readable medium may comprise code executable by the processor. The code may comprise (i) code for monitoring for an event to trigger a targeted offer, (ii) code for generating the offer upon detection of the event, the offer targeted to a consumer, wherein the offer is generated using payment data generated in response to transactions conducted by the consumer with a plurality of different merchants, (iii) determining a geographic location for redeeming the offer, (iv) generating a notification message about the offer, the notification message including the offer and the geographic location for redeeming the offer, and (iv) code for sending the notification message to a notification device operated by the consumer, wherein a graphical depiction of the offer is displayed on a map on the notification device based on the notification message.

Notification server 220 may determine whether consumer 30 would like to be notified about the targeted offer by communicating with enrollment system 210, generate the notification messages, and send the notification messages through gateway 240 to aggregator 37. In other words, notification module 27 determines whether a notification message about the targeted offer is required. For example, it is determined whether consumer 30 has enrolled in the notification program and whether the offer is a type of offer that consumer 30 would like to be notified about. Notification messages may then be sent to consumer 30 upon determining that the notification message is required. A geo-location of the redemption location is extracted from the offer information and is provided to mapping server 230. Mapping information is received from mapping server 230. As used herein, mapping information includes a map or other graphic representation of a geographic area and/or a location icon (i.e., a carrot, marker, etc.) which is a graphical indication of the location where the offer can be redeemed. The notification message (notification) may be generated including the offer and/or mapping information. For example, a notification may be generated using only the offer and another notification may be generated with the mapping information.

Mapping server 230 provides mapping information and is in communication with notification server 220. The communication may occur through an appropriately configured network, such as the internet, and one or more private networks, such as a cellular data network. Mapping server 230 may receive a message including geo-locations, interpret the message to extract geo-locations, convert the geo-locations into a common format, and provide mapping information to notification server 220. Mapping information may include a map with a graphic representation of a geo-location of a redemption location, such as a map and/or a location icon.

Mapping server 230 includes a map generator 235 which selects map tiles which encompass the geo-locations and generates a location icon to be overlaid on a map in the correct location. In one embodiment, maps are broken-down into smaller components, i.e., map tiles. The location icon is an object on the map that is tied to latitude/longitude coordinates of the map. The location icon may be used to indicate the point in the map representing the geo-locations. For example, if the geo-location of a merchant's retail store is provided, map generator may select one or more map tiles and may generate a graphical location icon (i.e., a carrot, marker, etc.) to point to the exact location of the merchant's retail store on the map. In one embodiment, the received (or extracted or otherwise determined) geo-location may not only represent the location of the transaction, but may also represent the location of notification device 36 in the form of a consumer icon. A consumer icon, which is a type of location icon, may be generated such that, for example, consumer 30 may visually compare on the map the location of the targeted offer relative to the current geographic location of consumer 30. The geographic location of the consumer may be determined by a geographic location of notification device 36, for example using a global positioning system (GPS) element in the notification device. The map may include multiple location icons which identify multiple retail stores that can redeem the targeted offer. Consumer 30 can use the map to quickly and easily ascertain which retail store is closest to his current position or otherwise most convenient by visually comparing the distance between the location icons and the consumer icon.

Notification server 220 may send the notifications through gateway 240 to aggregator 37. Gateway 140 is any suitable device that converts information from the protocol or format used in notification module 27 to those used in aggregator 37. Gateway 260 may be embodied by a computer or a network that allows or controls access to another computer or network. Gateway 260 may also be a software interface between the computer or network and another computer or network. As previously mentioned, aggregator 37 refers to any suitable entity or device that receives notifications, and collects and transmits the notifications to notification device 36 for consumer 30.

As previously mentioned, notification device 36 refers to any suitable device for receiving notifications and for providing the notifications to consumer 30. Notification device 36 may be in communication with payment processing network 26. In one embodiment, where the notification includes the targeted offer but does not include the mapping information, notification device 36 may include an interface to enable consumer 30 to select a notification and to send a request for mapping information for the selected notification to notification server 220 via payment processing network 26. Notification device 36 may then receive the requested mapping information from notification server 220 via gateway 240 and aggregator 37.

Figure 3:
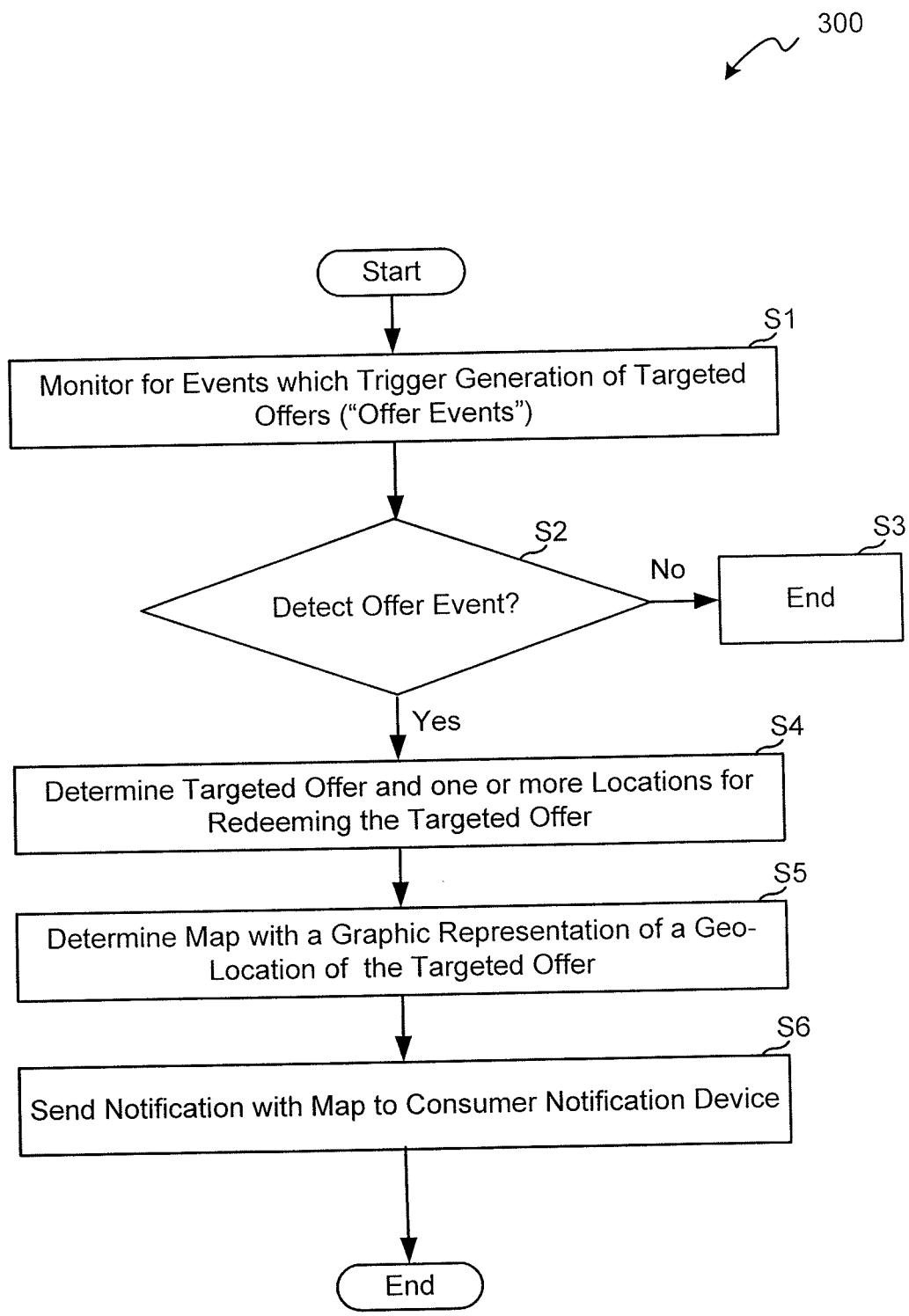
FIG. 3 is a flowchart illustrating steps in a method according to an embodiment of the invention.

FIG. 3 is a flowchart 300 illustrating steps in a method according to an embodiment of the invention. At step S1, events which trigger the generation of targeted offers ("offer events") are monitored. As previously described, examples of offer events include the following: initiation or completion of a transaction on an account associated with portable consumer device 32, a signal by a periodic timer which may be set to run for a discrete time period or for an on-going basis, a request for an offer initiated by consumer 30 or other suitable entity, and a geographic location of consumer 30 being within proximity to a target location.

At step S2, it is determined whether an offer event has been detected, for example after monitoring for the offer event(s). As previously discussed, the detection of an offer event triggers the generation of a targeted offer. For example, payment processing network 26 may detect the offer event and may generate the targeted offer. At step S3, if offer events are not detected, processing ends.

If the offer event has been detected, the targeted offer is determined and one or more locations for redeeming the targeted offer are also determined at step S4. Typically, payment processing network 26 generates targeted offers based on consumer 30 payment data (i.e., purchasing history) as determined by past purchases made by consumer 30 or made using a portable consumer device 32 associated with consumer 30. In order to provide offers which are truly relevant to consumer 30, the payment data is generated in response to transactions conducted by consumer 30 with a plurality of different merchants. The targeted offers also may be generated using any combination of the following: consumer ID, consumer name/address, consumer demographics, date/time, consumer proximity to the merchant's location, and consumer preferences, such as those identified via enrollment. In one embodiment, the payment data is collected by a payment processing network.

The one or more redemption locations can be determined in various ways. Merchant 22 (who is associated with the offer) may identify the redemption locations. Alternatively, payment processing network 26 may identify the locations where the offer can be redeemed.

In one embodiment, the geo-location of the one or more redemption locations is determined. This information may be provided by merchant 22, determined by retrieving the geo-location from a data store, or any other similar method. In yet another embodiment, the geo-location of consumer 30 or portable consumer device 32 which was used in a transaction which triggered the generation of the targeted offer may be used for the geo-location of the redemption location. Offer information can be generated to include the targeted offer and/or the geo-locations of redemption locations.

A map with a graphic representation of a geo-location of the targeted offer is determined at step S5. Using the offer information, a map may be generated with a location icon, such as a carrot or marker, which points to or otherwise identifies the geo-location(s) of the one or more redemption locations. For example, the location icon may graphically indicate the particular store where the targeted offer may be redeemed. In one embodiment, the location icon is embedded within the map. In another embodiment, the location icon is a separate object which is intended to overlay the map and is tied to latitude/longitude coordinates on the map. The metes and bounds of the map may be limited to representation of a relative vicinity of a present geo-location or position of consumer 30 and the location icon(s) fitting within these metes and bounds may be included.

At step S6, a notification including the map is sent to a consumer notification device. For example, the notification may be sent to notification device 36 belonging to consumer 30. The notification message (notification) may be generated including the offer and/or map and location icons. For example, a first notification may be generated including only the offer and a second notification may be generated including the map and location icons. The consumer may select the offer in the first notification, and the selection may trigger the generation of the second notification with the map and location icons, which may then be displayed on the notification device of the consumer. A graphical depiction of the notification or offer is displayed on a map on the notification device based on the notification message.

FIG. 4A(1) is a schematic drawing of a notification device 401 displaying an exemplary graphical user interface according to an embodiment of the invention. Notification device 401 includes a user interface that can include a display screen 404 and one or more control buttons 409 (e.g., a "home" button). Display screen 404 can present an exemplary graphical user interface (GUI) for displaying a list of indicators for viewing alerts, offers, and settings. A consumer can interact with the GUI image by tactile interaction with the indicators on the display screen 404 or by operating control buttons 409. Notification device 401 also has a connector 406 disposed on its bottom surface 410. Connector 406 can provide mechanical and electrical coupling to other devices.

FIG. 4A(2) is another schematic drawing of a notification device displaying an exemplary graphical user interface according to an embodiment of the invention. Notification device 420 includes a display screen 421. Display screen 421 presents an exemplary graphical user interface (GUI) for displaying one or more notifications 423, 425, 427, and 429. As previously described, notifications include offers targeted to a consumer. In one embodiment, the consumer may be the user of notification device 420.

FIG. 4A(3) is yet another schematic drawing of a notification device displaying an exemplary graphical user interface according to an embodiment of the invention. Notification device 430 includes a display screen 431. Display screen 431 presents an exemplary graphical user interface (GUI) for displaying a selected notification. For example, a consumer may select one of notifications 423, 425, 427, and 429 of FIG. 4(A)(2). The selected notification can be shown on display screen 431. As shown, a notification of an offer from Planet Hollywood® is selected. Display screen 431 includes a "Map It" indicator 432 for displaying a map of the selected offer, an "Action" indicator 433 for displaying a list of actions to be taken on the selected offer, and a "Delete" indicator 434 for deleting the notification.

FIG. 4A(4) is a schematic drawing of a notification device 440 for displaying an exemplary map with a graphic representation of a geo-location of the selected notification according to an embodiment of the invention. Notification device 440 includes a display screen 441 showing a map with location icons 443 and 445. For example, display screen 441 is shown after the consumer selects the "Map It" indicator 432 of FIG. 4A(3). Location icon 443 may indicate the geo-location of a first Planet Hollywood® store and location icon 445 may indicate the geo-location of a second Planet Hollywood® store.

Maps may include multiple location icons indicating a plurality of the most current locations where the selected notification can be redeemed. Location icons may also indicate the consumer's present location such that, for example, consumer 30 may visually compare on the map the redemption location relative to the current position of the consumer 30 (for example as determined by a geographic location of notification device 36). For example, location icon 445 may be a consumer icon or carrot showing the consumer's present location, as determined for example by a GPS location of the notification device 440.

FIG. 4B(1) is a schematic drawing of a notification device 450 for displaying an exemplary graphical user interface according to an embodiment of the invention. Notification device 450 includes a display screen 451. Display screen 451 presents an exemplary graphical user interface (GUI) for displaying a selected notification. As shown, a notification of an offer from 1-800-Flowers® is selected. Display screen 451 includes a "Map It" indicator 452 for displaying a map of the selected offer, an "Action" indicator 453 for displaying a list of actions to be taken on the selected offer, and a "Delete" indicator 454 for deleting the notification.

FIG. 4B(2) is a schematic drawing of a notification device 460 for displaying an exemplary map with a graphic representation of a geo-location of the selected notification according to an embodiment of the invention. Notification device 460 includes a display screen 461 showing a map with location icons 462, 463, 464, 465, 466, and 467. For example, display screen 461 is shown after the consumer selects the "Map It" indicator 452 of FIG. 4B(1). Location icons 462, 463, 464, 465, 466, and 467 indicate multiple florists who are valid providers for or are otherwise associated with the merchant 1-800-Flowers®. Since the merchants themselves can identify locations where the targeted offer can be redeemed, the system providing the notification need not be concerned with maintaining records of which florist locations continue to be valid providers for 1-800-Flowers®, the capacity of the individual retail locations, and inventory and stock of the individual retail locations.

III. Notification Infrastructure Supporting Actions to be Performed on a Notification In addition to providing near-real time notifications for targeted offers, methods and systems as described herein enable consumers to act on those notifications quickly and easily. For example, consumers may select actions to be performed on a notification (and/or associated offer) after receiving the notification on a PDA. In one embodiment, the actions provide options to the consumer for various ways to redeem the targeted offer. A GUI may be provided to the consumer including a list of selectable actions. Actions to be performed on a targeted offer may include one or more of the following: reserve with confirmation, purchase, set for will call, and redeem at checkout using mobile device. The consumer need only select an action and the payment processing system immediately fulfills the action. Consumers can redeem offers using their portable electronic device and can immediately collect the goods or services at a physical store location.

In one embodiment, the actions may be customized. For example, actions may be context-specific and/or consumer-specific. Consumer 30 enrolls in the program to receive notifications on notification device 36. Consumer 30 may send enrollment information to enrollment system 210. The enrollment information may specify the types of actions that consumer 30 would like to enable. Actions may be specified in various ways. Actions may be specified based on any attribute/characteristic of an offer. For example, consumer 30 may set actions to be performed for all offer types. In another embodiment, one set of actions may be set out for offers for goods and another set of actions may be set out for offers for services. In an alternative embodiment, a default set of actions may be provided.

Customized actions may be determined by notification module 27 and communicated to notification device 36. For example, when notification module 27 is triggered to generate a notification, notification server 220 may determine from enrollment system 210 one or more customized actions associated with a targeted offer and may embed a list of the customized actions within the notification itself.

Figure 5:
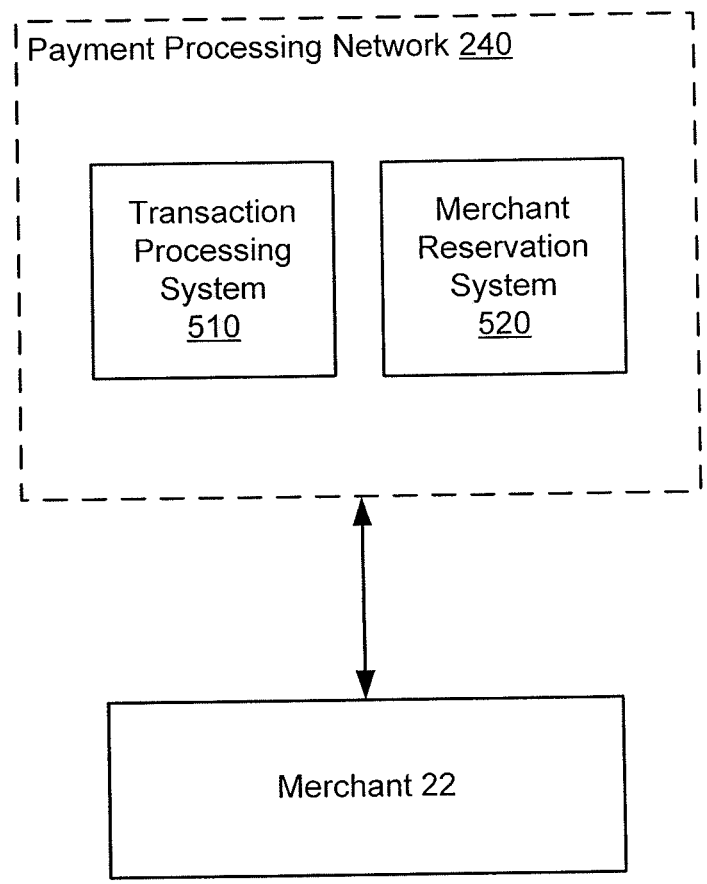
FIG. 5 is a block diagram of a payment processing network according to an embodiment of the invention.

FIG. 5 is a block diagram of a payment processing network according to an embodiment of the invention. Consumer 30 may receive a notification via notification device 36 in the manner described above. Through a GUI of notification device 36, consumer 30 may then select one or more notifications and an action which is to be performed upon the selected notification(s). Consumer 30 may also select one or more redemption locations. Payment processing network 240, which is in communication with notification device 36, receives the selected notification(s), the selected action, and/or the selected redemption location(s). The selected notification(s), selected action, and/or selected redemption location(s) are distributed to an appropriate system/module such as Transaction Processing System 510 and Merchant Reservation System 520 based on the action selected.

It may be desirable to allow a consumer to reserve the subject of the targeted offer (i.e., goods or services) and to receive a confirmation that the reservation has been accepted. For example, consumer 30 may receive a notification of an offer for a dozen red roses from 1-800-Flowers®. Consumer 30 may select the "Reserve with Confirmation" action to be applied to a selected location for redeeming the 1-800-Flowers® offer. Payment processing network 240 may distribute the action, selected notification, and/or the selected location to merchant reservation system 520 for fulfillment. A message may be provided to a system of merchant 22 for reserving the subject of the targeted offer.

Upon receipt of a "Purchase" action to be applied to one or more selected notifications, payment processing network 240 may distribute the action, selected notifications, and/or selected redemption locations to transaction processing system 510 for fulfillment, which may activate channels to engage in a purchase transaction. In one embodiment, the consumer's notification device is used to purchase the goods or services that are the subjects of the targeted offer. Transaction processing system 510 may send a message to a system of merchant 22 for purchasing the subject of the offer.

For example, the consumer's notification device can engage in a purchase transaction with the selected redemption location of merchant 22. The consumer may then go to the physical location to take possession of the subject of the offer. In one embodiment, the purchase transaction is completed, and as such, the consumer does not need to engage in any further purchase transactions at the redemption location. Other known methods of purchasing a selected good or service may also be implemented without departing from the scope of the invention.

Upon receipt of a "Will Call" action to be applied to one or more selected notifications, payment processing network 240 may distribute the action, selected notifications, and/or selected redemption locations to merchant reservation system 520 for fulfillment, which may activate channels to place the subject of the offer at Will Call in a redemption location.

Upon receipt of a "Redeem at Checkout using Mobile Device" action to be applied to one or more selected notifications, payment processing network 240 may distribute the action, selected notifications, and/or selected redemption locations to merchant reservation system 520 for fulfillment.

Figure 6:
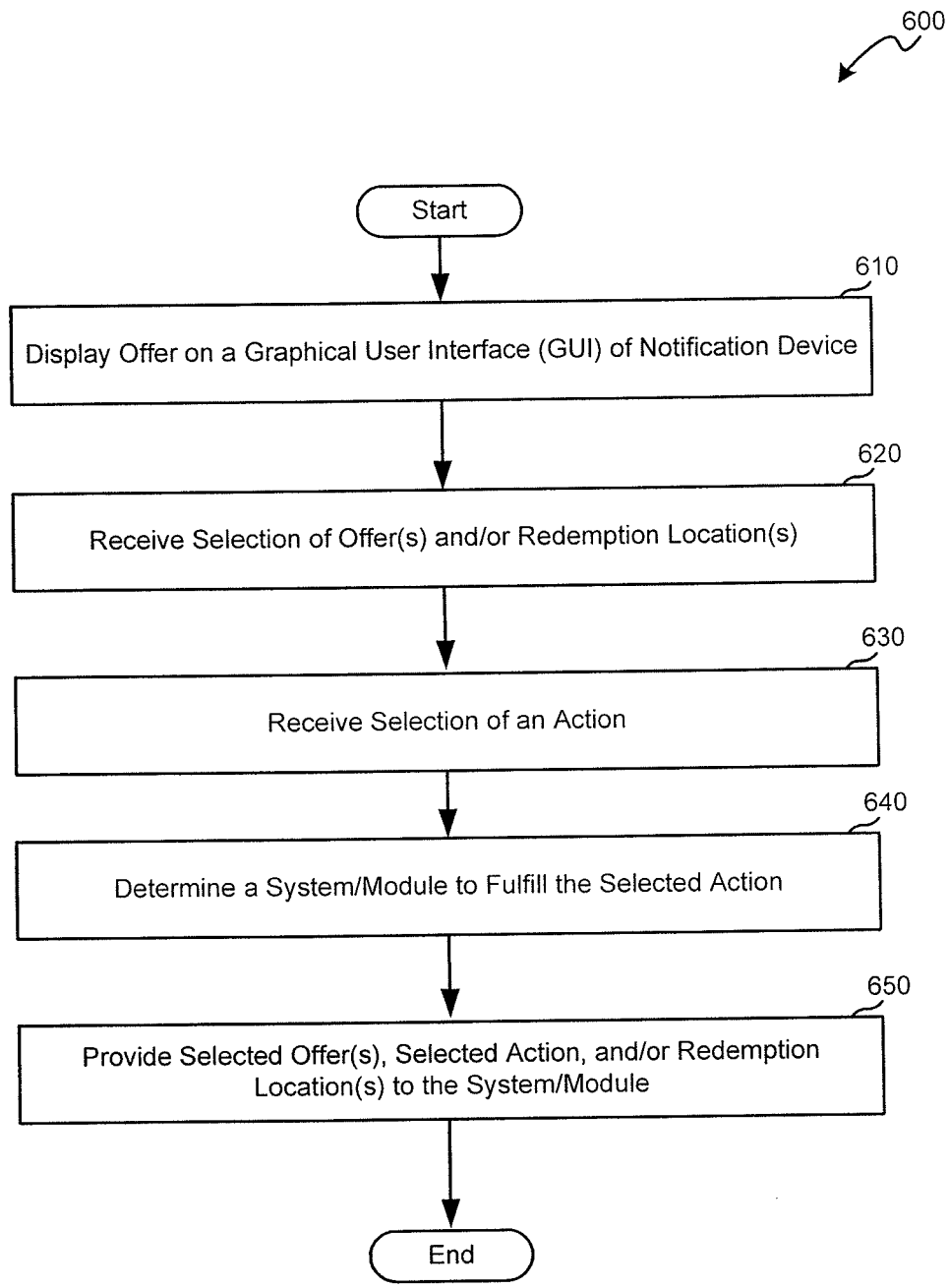
FIG. 6 is a flowchart illustrating steps for implementing consumer-selected actions which are associated with one or more selected notifications according to an embodiment of the invention.

FIG. 6 is a flowchart 600 illustrating steps for implementing consumer-selected actions which are associated with one or more selected notifications according to an embodiment of the invention. Notifications including targeted offers are received at a notification device of a consumer. At step 610, the notification including the targeted offer is displayed on a GUI of a notification device.

Through the GUI of the notification device, the consumer may select one or more of the received notifications and/or locations where the targeted offer can be redeemed. An action to be applied to the selected notifications and/or redemption locations is received. Notification device 36 may receive these selections in steps 620 and 630.

At step 640, a system or module to fulfill the selected action is determined. The determination may be made based on an association among actions and fulfillment systems or modules. In one embodiment, payment processing network 26 distributes the selected notification(s) to a system or module based on the action selected. Other methods of distribution are also contemplated. At step 650, the selected notification(s), selected action, and/or redemption location(s) are provided to the system or module for fulfillment. In one embodiment, fulfillment of the action may be achieved by communication with the merchant.

FIG. 7A(1) is a schematic drawing of a notification device 710 for displaying an exemplary map with a graphic representation of a geo-location of the selected notification according to an embodiment of the invention. Notification device 710 includes a display screen 713 showing a map with location icons 715 and 717. For example, display screen 713 is shown after the consumer selects an option to display a map of a particular notification. Location icons 715 and 717 indicate multiple physical locations where the offer associated with the notification can be redeemed. For example, if a targeted offer from American Eagle Outfitters® is selected, location icons 715 and 717 may indicate two American Eagle Outfitters® retails shops where the targeted offer can be redeemed. Display screen 713 also includes an "Actions" indicator 718 for displaying actions to be performed on the selected offer, and a "Delete" indicator 719 for deleting the notification.

FIG. 7A(2) is a schematic drawing of a notification device 720 for displaying actions associated with the selected notification according to an embodiment of the invention. Notification device 720 includes a display screen 725 for showing an exemplary list of actions that may be performed on the selected notification. As previously mentioned, the actions may be customized or are otherwise context-specific. The actions may include: "Reserve with Confirmation," "Purchase," "Will Call," and "Redeem at Checkout Using Mobile Device." As shown, the "Reserve with Confirmation" action is selected.

FIG. 7B(1) is a schematic drawing of a notification device 730 for displaying a selected action according to an embodiment of the invention. Notification device 730 includes an exemplary display screen 733 as may be provided upon selection of a "Reserve with Confirmation" action. Display screen 733 includes the selected notification on the upper portion of display screen 733. Display screen 733 also includes multiple indicators for enabling a consumer to reserve the subject of the targeted offer, which in this case is shown to be "AE Classic Cardigan." As shown, a "Yes" indicator 735, a "No" indicator 737, and a "Cancel" indicator 739 are provided. Other methods for enabling a consumer to reserve the goods, service, or other subjects of the targeted offer are also contemplated.

FIG. 7B(2) is a schematic drawing of a notification device 740 for displaying a confirmation page according to an embodiment of the invention. Notification device 740 includes an exemplary display screen 743 as may be provided upon performing a "Reserve with Confirmation" action and receiving a confirmation message from the merchant system indicating that the reservation of the goods or services has been confirmed. The upper portion of display screen 743 of notification device 740 shows a confirmation number of the reservation, details of the reserved item, and information identifying the retail location where the item is reserved. Display screen 743 also includes a "Cancel" indicator 745 for canceling the reservation.

Figure 7C:
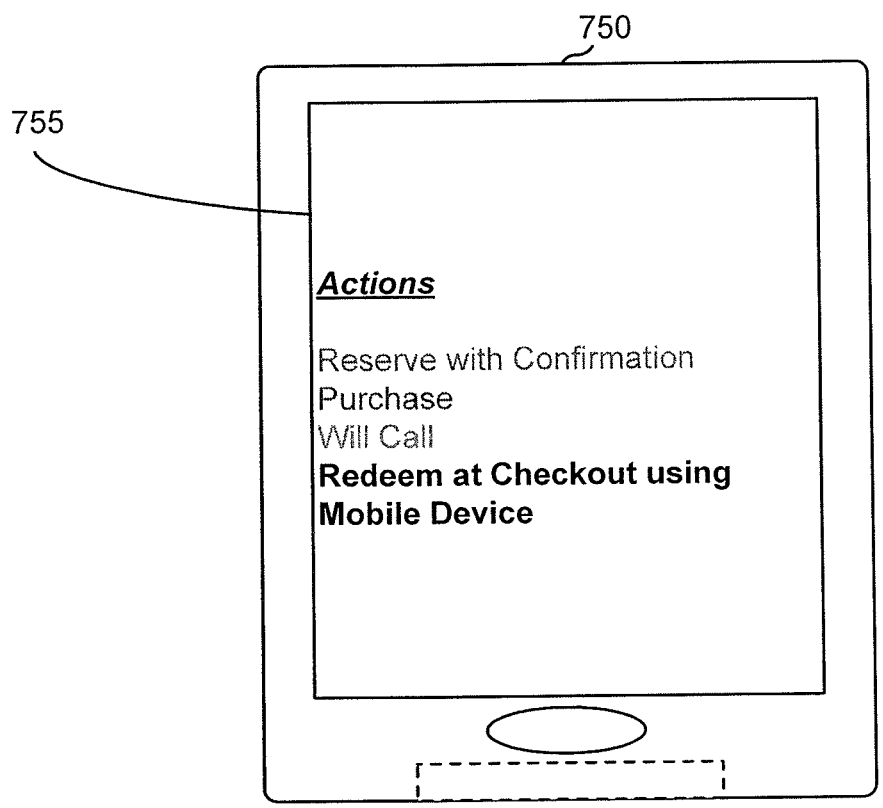
FIG. 7C is a schematic drawing of a notification device displaying additional actions according to an embodiment of the invention.

FIG. 7C is a schematic drawing of a notification device 750 displaying additional actions according to an embodiment of the invention. Notification device 750 includes a display screen 755 for showing an exemplary list of actions that may be performed on the selected notification. As shown, the "Redeem at Checkout using Mobile Device" action is selected.

The redemption of offers can be time consuming, and often requires skill on the part of the cashier to actually redeem the offer, for example, by entering offer codes, providing redemption codes, etc. If the cashier of merchant 22 does not have the requisite skill, the time required to redeem the offer becomes obtrusive for the consumer. It may be desirable to expedite or otherwise streamline the checkout process by which consumers can redeem their targeted offers and make purchases of goods and services. Moreover, an untrained cashier may enter an incorrect code causing disruption to the merchant's records.

In one embodiment, the consumer can select the "Redeem at Checkout using Mobile Device" action causing, for example, merchant reservation system 520 to interface with merchant 22 and to provide a reconciliation process that does not involve the store clerk or cashier. Merchant 22 is made aware that the consumer has accepted the targeted offer. For example, a message is sent to merchant 22 to associate the consumer with the terms of the offer. When consumer 30 approaches the cashier to redeem the offer, the cashier does not need to perform any functions beyond that of a typical purchase transaction. For example, the cashier may scan a barcode for an item that is the subject of the targeted offer. The backend system of the merchant automatically adjusts the price based on the acceptance of the offer. In one embodiment, the access device (such as a point of sale device) of merchant 22 automatically present to the associated consumer 30, a purchase price according to the terms of the offer. The cashier need not take other actions to redeem the offer for consumer 30. In one embodiment, the backend system of the merchant authorizes the redeemer as consumer 30 who accepted the targeted offer.

Figure 8:
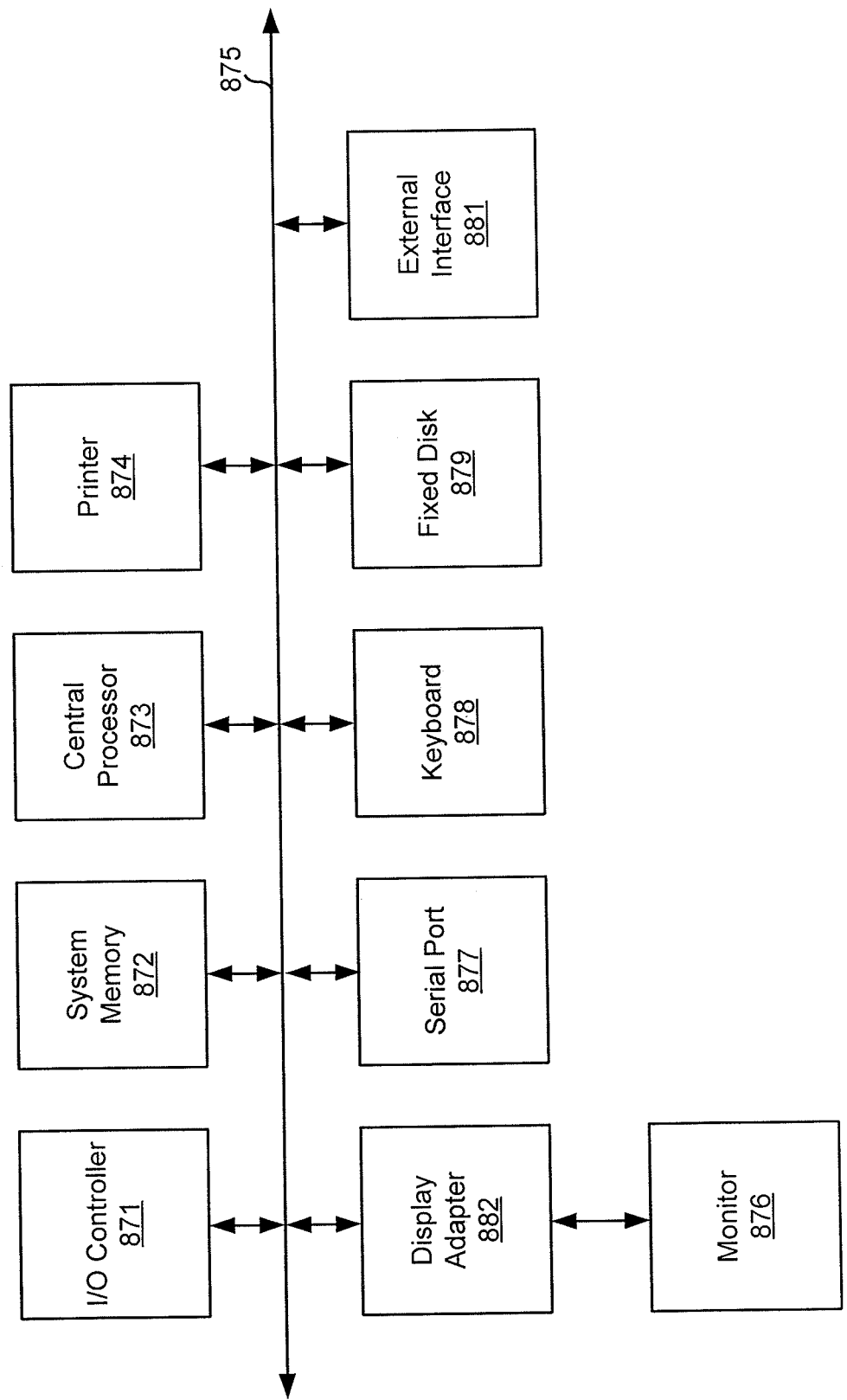
FIG. 8 is a block diagram of a computer apparatus.

Any of the server computers, client computers, and even some portable consumer devices described above may utilize any suitable number of subsystems. Examples of such subsystems or components are shown in FIG. 8, which is a block diagram of a computer apparatus. The subsystems shown in FIG. 8 are interconnected via a system bus 875. Additional subsystems such as a printer 874, keyboard 878, fixed disk 879, monitor 876, which is coupled to display adapter 882, and others are shown. Peripherals and input/output (I/O) devices, which couple to I/O controller 871, can be connected to the computer system by any number of means known in the art, such as serial port 877. For example, serial port 877 or external interface 881 can be used to connect the computer apparatus to a wide area network such as the Internet, a mouse input device, or a scanner. The interconnection via system bus allows the central processor 873 to communicate with each subsystem and to control the execution of instructions from system memory 872 or the fixed disk 879, as well as the exchange of information between subsystems. The system memory 872 and/or the fixed disk 879 may embody a computer readable medium.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

What is claimed is:

1. A method comprising:
receiving, by a processor, transaction data associated with an account of a consumer;
determining, by the processor, from the transaction data, an occurrence of an event to trigger an offer, the event being a completion of a transaction;
generating, by the processor, the offer upon detection of the occurrence of the event, the offer targeted to the consumer, wherein the offer is generated using historic payment data that was generated in response to past transactions conducted by the consumer with a plurality of different merchants, wherein the historic payment data includes previous purchases made using a portable consumer device associated with the consumer, wherein the portable consumer device comprises a data space configured to store operating parameters, wherein the data space is one of a secure data space and a physically separate data space, wherein the historic payment data is collected by a payment processing network, and wherein the payment processing network is configured to receive authorization request messages from acquirers associated with the plurality of different merchants, send the authorization request messages to an issuer associated with the consumer, receive authorization response messages from the issuer associated with the consumer, and send authorization response messages to the acquirers associated with the plurality of different merchants;

determining, by the processor, a geographic location for redeeming the offer by
sending, by the processor, a request to a merchant system for one or more redemption locations affiliated with a merchant,
receiving, by the processor, from the merchant system identification data for the one or more redemption locations, and
determining, by the processor, the geographic location for redeeming the offer using the identification data;
generating, by the processor, a notification message including the offer, which is triggered by the completion of the transaction, and a graphical depiction of the geographic location for redeeming the offer, the graphical depiction of the geographic location generated by
selecting, by the processor, a map portion encompassing the geographic location, and
modifying, by the processor, the map portion by overlaying an indicator icon identifying the geographic location; and
sending, by the processor, the notification message to a notification device operated by the consumer, wherein the graphical depiction of the offer is displayed on a map on the notification device;
determining, by the processor, a plurality of redemption actions available for redeeming the offer;
providing, by the processor, to the notification device an indication of the plurality of redemption actions available;
receiving, by the processor, a selection of one of the plurality of redemption actions from the notification device;
providing, by the processor, a message to the merchant system for completing the selected redemption action; and
receiving, by the processor, prior to arrival of the consumer at the geographic location, a confirmation message from the merchant system indicating that the selected redemption action is confirmed.

2. The method of claim 1, wherein determining the occurrence of the event to trigger further comprises:
comparing, by the processor, a geo-location of the notification device with a geo-location of a target location; and
determining, by the processor, that the consumer has traveled in a proximity to the target location based on the comparison.

3. The method of claim 2, wherein the target location is a retail location.

4. The method of claim 1, wherein the event to trigger the offer further comprises receiving a request, initiated by the consumer, for the offer.

5. The method of claim 1, further comprising:
determining a consumer icon identifying a geographic location of the consumer relative to the map, wherein the geographic location of the consumer is determined using a global positioning system (GPS) element in the notification device; and
providing the consumer icon to the notification device.

6. The method of claim 1, wherein a subject of the offer is a good or service provided by the merchant and wherein the selected redemption action is an action for reserving the good or service on behalf of the consumer.

7. The method of claim 1, wherein a subject of the offer is a good or service provided by the merchant, and wherein the selected redemption action is an action for purchasing the good or service using the notification device.

8. The method of claim 1, wherein a subject of the offer is a good or service provided by the merchant, and wherein the selected redemption action is an action for accepting the offer and wherein the message to the merchant system of the merchant associates the consumer with a term of the offer, whereby an access device of the merchant automatically presents, to the associated consumer, a purchase price of the good or service according to the term of the offer.

9. A notification device comprising:
a processor;
an antenna coupled to the processor; and
a computer readable medium coupled to the processor, the computer readable medium comprising code executable by the processor, the computer readable medium comprising:
code for receiving an offer targeted to a consumer based on historic payment data that was generated in response to past transactions conducted by the consumer with a plurality of different merchants, the notification device operated by the consumer, wherein the historic payment data includes previous purchases made using a portable consumer device associated with the consumer, wherein the portable consumer device comprises a data space configured to store operating parameters, wherein the data space is one of a secure data space and a physically separate data space, wherein the historic payment data is collected by a payment processing network, and wherein the payment processing network is configured to receive authorization request messages from acquirers associated with the plurality of different merchants, send the authorization request messages to an issuer associated with the consumer, receive authorization response messages from the issuer associated with the consumer, and send authorization response messages to the acquirers associated with the plurality of different merchants, wherein the offer is generated by the payment processing network based on receiving transaction data associated with an account of a consumer, and determining from the transaction data, an occurrence of an event to trigger the offer, the event being a completion of a transaction;
code for receiving a map comprising a graphical depiction of the offer, which is triggered by the completion of the transaction, and a graphical depiction of a geographic location for redeeming the offer, wherein the geographic location for redeeming the offer was determined by the payment processing network by sending a request to a merchant system for one or more redemption locations affiliated with the merchant after generating the offer, receiving from the merchant system identification data for the one or more redemption locations, determining the geographic location for redeeming the offer using the identification data, selecting a map portion encompassing the geographic location, and modifying the map portion by overlaying an indicator icon identifying the geographic location, wherein the offer is received by the notification device upon detection, by the payment processing network, of a triggering event;
code for receiving an indication of the plurality of redemption actions available for redeeming the offer;
code for selecting one of the plurality of redemption actions and sending the selected redemption action to the payment processing network, wherein the payment processing network provides a message to the merchant system for completing the selected redemption action; and code for receiving, prior to arriving at the geographic location, a confirmation message indicating that the selected redemption action is confirmed by the merchant system.

10. A system comprising:
a payment processing network configured to:
receive transaction data associated with an account of a consumer;
determine from the transaction data, an occurrence of an event to trigger a targeted offer, the event being a completion of a transaction;
generate the offer upon detection of the event, the offer targeted to the consumer, wherein the offer is generated using historic payment data that was generated in response to past transactions conducted by the consumer with a plurality of different merchants, wherein the historic payment data includes previous purchases made using a portable consumer device associated with the consumer, wherein the portable consumer device comprises a data space configured to store operating parameters, wherein the data space is one of a secure data space and a physically separate data space, wherein the historic payment data is collected by the payment processing network, and wherein the payment processing network is configured to receive authorization request messages from acquirers associated with the plurality of different merchants, send the authorization request messages to an issuer associated with the consumer, receive authorization response messages from the issuer associated with the consumer, and send authorization response messages to the acquirers associated with the plurality of different merchants;
determine a geographic location for redeeming the offer by
sending a request to a merchant system for one or more redemption locations affiliated with the merchant,
receiving from the merchant system identification data for the one or more redemption locations,
determining the geographic location for redeeming the offer using the identification data; and
a notification module coupled to the payment processing network, the notification module configured to:
generate a notification message including the offer, which is triggered the completion of the transaction, and a graphical depiction of the geographic location for redeeming the offer, the graphical depiction of the geographic location generated by
selecting a map portion encompassing the geographic location, and
modifying the map portion by overlaying an indicator icon
identifying the geographic location;
send the notification message to a notification device operated by the consumer, wherein the graphical depiction of the notification message is displayed on a map on the notification device;
determine a plurality of redemption actions available for redeeming the offer;
provide to the notification device an indication of the plurality of redemption actions available;
receive a selection of one of the plurality of redemption actions;

provide a message to the merchant system for completing the selected redemption action; and
receive, prior to arrival of the consumer at the geographic location, a confirmation message from the merchant system indicating that the selected redemption action is confirmed.

11. The system of claim 10, wherein a subject of the offer is a good or service provided by the merchant and wherein the selected redemption action is an action for reserving the good or service on behalf of the consumer.

12. A non-transitory machine-readable storage medium storing a sequence of instructions, execution of which causes a processor to provide notifications of targeted purchase offers, the execution of the sequence of instructions causes the processor to perform the actions of:
receiving transaction data associated with an account of a consumer;
determining, from the transaction data, an occurrence of an event to trigger an offer, the event being a completion of a transaction;
generating the offer upon detection of the occurrence of the event, the offer targeted to the consumer, wherein the offer is generated using historic payment data that was generated in response to past transactions conducted by the consumer with a plurality of different merchants, wherein the historic payment data includes previous purchases made using a portable consumer device associated with the consumer, wherein the portable consumer device comprises a data space configured to store operating parameters, wherein the data space is one of a secure data space and a physically separate data space, wherein the historic payment data is collected by a payment processing network, and wherein the payment processing network is configured to receive authorization request messages from acquirers associated with the plurality of different merchants, send the authorization request messages to an issuer associated with the consumer, receive authorization response messages from the issuer associated with the consumer, and send authorization response messages to the acquirers associated with the plurality of different merchants;
determining a geographic location for redeeming the offer by
sending a request to a merchant system for one or more redemption locations affiliated with a merchant,
receiving from the merchant system identification data for the one or more redemption locations, and
determining the geographic location for redeeming the offer using the identification data;
generating, by the processor, a notification message including the offer, which is triggered the completion of the transaction, and a graphical depiction of the geographic location for redeeming the offer, the graphical depiction of the geographic location generated by
selecting a map portion encompassing the geographic location, and
modifying the map portion by overlaying an indicator icon identifying the geographic location; and
sending the notification message to a notification device operated by the consumer, wherein the graphical depiction of the offer is displayed on a map on the notification device;
determining a plurality of redemption actions available for redeeming the offer;
providing to the notification device an indication of the plurality of redemption actions available;

receiving a selection of one of the plurality of redemption actions from the notification device;

providing a message to the merchant system for completing the selected redemption action; and receiving, prior to arrival of the consumer at the geographic location, a confirmation message from the merchant system indicating that the selected redemption action is confirmed.

13. The method of claim 1, wherein the plurality of redemption actions include at least two of reserve with confirmation, purchase, set for will call, and redeem at check-out.

14. The method of claim 1, wherein the request to the merchant for the one or more redemption locations is for redemption locations within a threshold distance from a target location, and the threshold distance is narrowed and expanded based on a number of redemption locations.

15. The method of claim 1, wherein a subject of the offer is a good provided by the merchant and wherein the merchant system checks a current inventory level for the good and only identifies geographic locations for locations that have more than a threshold level of the good available in the current inventory level.

16. The method of claim 1, wherein the one or more redemption locations have a threshold inventory directed to an item of the offer.

17. The method of claim 1, wherein the plurality of redemption actions available is customized by the consumer.

18. The method of claim 17, wherein redemption actions for goods are customized to be different from redemption actions for services.

* * * * *